(12) United States Patent
Jin

(10) Patent No.: US 11,724,942 B2
(45) Date of Patent: Aug. 15, 2023

(54) METHOD FOR PREPARING A SELF-ASSEMBLED POROUS THREE-DIMENSIONAL ZINC OXIDE NANOPARTICLE STRUCTURE USING A MICROFLUIDIC DEVICE, ZINC OXIDE NANOPARTICLES, AN AGGREGATE OF ZINC OXIDE NANOPARTICLES, AND ZINC OXIDE NANOPARTICLE STRUCTURE PREPARED THEREFROM, AND A BIO-INK INCLUDING THE SAME

(71) Applicant: Su Eon Jin, Seoul (KR)

(72) Inventor: Su Eon Jin, Seoul (KR)

( * ) Notice: Subject to any disclaimer, the term of this patent is extended or adjusted under 35 U.S.C. 154(b) by 0 days.

(21) Appl. No.: 17/636,614

(22) PCT Filed: Aug. 30, 2019

(86) PCT No.: PCT/KR2019/011174
§ 371 (c)(1),
(2) Date: Feb. 18, 2022

(87) PCT Pub. No.: WO2021/033821
PCT Pub. Date: Feb. 25, 2021

(65) Prior Publication Data
US 2022/0340441 A1    Oct. 27, 2022

(30) Foreign Application Priority Data

Aug. 20, 2019    (KR) .......................... 10-2019-0102030

(51) Int. Cl.
*C01G 9/02*    (2006.01)
*B33Y 70/00*    (2020.01)
*B01L 3/00*    (2006.01)
*B82Y 30/00*    (2011.01)
*B82Y 40/00*    (2011.01)

(52) U.S. Cl.
CPC .............. *C01G 9/02* (2013.01); *B01L 3/5027* (2013.01); *B33Y 70/00* (2014.12); *B82Y 30/00* (2013.01); *B82Y 40/00* (2013.01); *C01P 2004/32* (2013.01); *C01P 2004/50* (2013.01);
(Continued)

(58) Field of Classification Search
None
See application file for complete search history.

(56) References Cited

FOREIGN PATENT DOCUMENTS

| JP | 2004-292282 A | 10/2004 |
| KR | 10-2011-0009096 A | 1/2011 |

(Continued)

OTHER PUBLICATIONS

Translation of CN 106966423 provided by Google Dec. 10, 2022.*
(Continued)

*Primary Examiner* — Guinever S Gregorio
(74) *Attorney, Agent, or Firm* — Bridgeway IP Law Group, PLLC; Sang Ho Lee; Hyun Woo Shin

(57) ABSTRACT

The present application provides a method for preparing a zinc oxide nanoparticle structure synthesized using a microfluidic device and a self-assembled porous three-dimensional zinc oxide nanoparticle structure prepared therefrom. The self-assembled porous three-dimensional zinc oxide nanoparticle structure of the present application is a three-dimensional structure in which micropores, mesopores and macropores are created, and has excellent reactivity.

10 Claims, 24 Drawing Sheets

(52) U.S. Cl.
CPC ...... *C01P 2004/64* (2013.01); *C01P 2006/12* (2013.01); *C01P 2006/16* (2013.01)

(56) References Cited

FOREIGN PATENT DOCUMENTS

| KR | 10-2013-0079799 A | 7/2013 |
| KR | 10-2017-0061499 A | 6/2017 |
| KR | 10-2017-0067206 A | 6/2017 |

OTHER PUBLICATIONS

Xianfeng Zheng et al., "Bio-Inspired Murray Materials for Mass Transfer and Activity", Nature Communications. 2017, Thesis No. 14921, pp. 1-9, Apr. 6, 2017. DOI: 10.1038/ncomms14921.

Hyun Wook Kang et al., "Continuous synthesis of zinc oxide nanoparticles in a microfluidic system for photovoltaic application", Nanoscale. 2014, vol. 6, pp. 2840-2846. DOI: 10.1039/c3nr06141h.

* cited by examiner

METHOD FOR PREPARING A SELF-ASSEMBLED POROUS THREE-DIMENSIONAL ZINC OXIDE NANOPARTICLE STRUCTURE USING A MICROFLUIDIC DEVICE, ZINC OXIDE NANOPARTICLES, AN AGGREGATE OF ZINC OXIDE NANOPARTICLES, AND ZINC OXIDE NANOPARTICLE STRUCTURE PREPARED THEREFROM, AND A BIO-INK INCLUDING THE SAME

TECHNICAL FIELD

This application claims the benefit of the filing date of Korean Patent Application No. 10-2019-0102030 filed with the Korean Intellectual Property Office on Aug. 20, 2019, the entire contents of which are incorporated herein by reference.

The present application relates to a method for preparing a self-assembled porous three-dimensional zinc oxide nanoparticle structure using a microfluidic device; zinc oxide nanoparticles, an aggregate of zinc oxide nanoparticles, and zinc oxide nanoparticle structure prepared therefrom; and a bio-ink including the same.

BACKGROUND ART

Zinc oxide (ZnO) is recognized as a Generally Recognized as Safe (GRAS) material by the US Food and Drug Administration (US FDA), and is widely used in cosmetics, pharmaceuticals, photocatalysts, fuels, sensors, etc.

Unlike conventional zinc oxide nanoparticles, self-assembled porous zinc oxide nanoparticles can smooth mass transfer by porous channels in the structure, and can adsorb various kinds of gases and chemicals with a wide specific surface area.

A microfluidic device is a device used for the synthesis and manufacture of nanoparticles, detection and analysis of substances, configuration of a three-dimensional cellular environment, medical devices, etc., and is one of the innovative methods for safely synthesizing and preparing monodisperse nanoparticles.

Conventional methods for preparing zinc oxide nanoparticles include a sol-gel method, a microwave method, and a hydrothermal method.

As related art, there is "a method for preparing zinc oxide nanoparticles and zinc oxide nanoparticles prepared according to the method," Korean Patent Application Laid-Open No. 10-2017-0067206, hereinafter referred to as Patent Document 1.

In the case of the related art according to Patent Document 1, there is a disclosed method for preparing nanoparticles having a hexagonal nanorod structure. However, the nanoparticles prepared in the related art do not have uniform particles, and the shape and size of pores do not vary. Therefore, it is necessary to develop a method for preparing zinc oxide nanoparticles capable of forming three-dimensional nanostructures having various pore shapes and sizes.

DISCLOSURE

Technical Problem

An object of the present application is to provide a method for preparing a self-assembled porous three-dimensional zinc oxide nanoparticle structure using a microfluidic device.

Another problem to be solved by the present application is to provide zinc oxide nanoparticles, an aggregate of zinc oxide nanoparticles, and zinc oxide nanoparticle structure having excellent porosity, dispersibility, and reactivity.

Another problem to be solved by the present application is to provide a bio-ink including a zinc oxide nanoparticle structure.

Technical Solution

The present application provides a method for preparing a self-assembled porous three-dimensional zinc oxide nanoparticle structure using a microfluidic device to achieve the above object.

According to one embodiment of the present application, the preparation method may include mixing a zinc precursor and an amine compound to generate a dispersion; generating nanoparticles by applying heat of a first temperature while introducing the dispersion into a microfluidic channel in a microfluidic device; aggregating nanoparticles by reacting the solution discharged from the microfluidic channel at a second temperature that is higher than the first temperature; and mixing the solution with a $C_1$-$C_4$ alcohol and drying the precipitates to obtain nanoparticles or aggregates thereof.

One embodiment of the present application may further include reacting the nanoparticles or aggregates thereof in an organic solvent at 40° C. to 60° C. to form a three-dimensional nanostructure.

According to one embodiment of the present application, the content of the nanoparticle aggregates in the organic solvent may be included in a weight-to-volume ratio of 2 w/v to 10 w/v. Specifically, the weight-to-volume ratio may be mg/mL.

According to an embodiment of the present application, the organic solvent may be at least one selected from the group consisting of hexane, methylene chloride, chloroform, benzene, toluene, xylene, isopropyl ether, triethylamine, heptane, octane, nonane, decane, isobutyl isobutyrate, tributylamine, undecane, 2,2,4-trimethylpentylacetate, isobutyl heptyl ketone, diisobutyl ketone, cyclopentane, cyclohexane, isobutylbenzene and ethylbenzene.

According to one embodiment of the present application, in the step of generating the dispersion, the content of the zinc precursor dispersed in the amine compound may be 1.67% (w/v) or more and 3.57% (w/v) or less.

According to one embodiment of the present application, the first temperature may be 70° C. to 90° C., and the second temperature may be 140° C. to 180° C.

According to one embodiment of the present application, in the step of generating the nanoparticles, the reaction time is 20 minutes to 40 minutes, in the step of aggregating the nanoparticles, the reaction time may be 50 minutes to 100 minutes.

According to one embodiment of the present application, the flow rate when introducing the dispersion may be 0.05 mL/min to 0.2 mL/min. The flow rate may be a flow rate in the microfluidic channel.

According to an embodiment of the present application, the amine compound may be at least one selected from the group consisting of an alkylamine having 6 to 20 carbon atoms, oleylamine, hexamethyleneamine, hexamethylenetetraamine, cyclohexylamine, monoethanolamine, diethanolamine, ethylenediamine, polyethyleneamine and triethanolamine.

According to one embodiment of the present application, the zinc precursor may be at least one selected from the group consisting of zinc acetate, zinc chloride, zinc sulfate, zinc citrate, zinc nitrate, zinc nitrate hexahydrate, zinc acetate dihydrate, zinc phosphate, zinc formate, zinc fluoride, zinc bromide, zinc iodide, zinc acetylacetonate, zinc hydroxide, diethyl zinc, dimethyl zinc, zinc peroxide, and zinc perchlorate.

According to one embodiment of the present application, the alcohol may be at least one selected from the group consisting of methanol, ethanol, butanol, isopropyl alcohol, propanol, ethylene glycol and propylene glycol.

According to one embodiment of the present application, the self-assembled porous three-dimensional zinc oxide nanoparticle structure prepared by the above method may include monodisperse porous zinc oxide nanoparticles including channel-type micropores having a diameter of 0.1 nm to 2 nm in the nanoparticles; and a porous aggregate of zinc oxide nanoparticles formed by aggregating the nanoparticles so that the distance between the nanoparticles includes mesopores having a diameter of 2 nm to 50 nm.

According to one embodiment of the present application, the self-assembled porous three-dimensional zinc oxide nanoparticle structure prepared by the above method may be a three-dimensional structure in the form of a honeycomb formed by the nanoparticle aggregates so that a distance between the nanoparticles includes macropores of 50 nm to 2.5 μm.

One embodiment of the present application provides porous zinc oxide nanoparticles including channel-type micropores having a diameter of 0.1 nm to 2 nm in the particles as monodisperse spherical nanoparticles having a particle size of 100 nm or less.

An embodiment of the present application provides, as an aggregate of nanoparticles including monodisperse spherical nanoparticles having a particle size of 100 nm or less, and channel-type micropores having a diameter of 0.1 nm to 2 nm in the particles, an aggregate of porous zinc oxide nanoparticles including mesopores of 2 nm to 50 nm in a distance between the nanoparticles.

One embodiment of the present application provides a self-assembled porous three-dimensional zinc oxide nanoparticle structure including macropores of 50 nm to 2.5 μm in a distance between nanoparticles including, as monodisperse spherical nanoparticles having a particle size of 100 nm or less, nanoparticles including channel-type micropores having a diameter of 0.1 nm to 2 nm in the particles, and an aggregate of nanoparticles including mesopores of 2 nm to 50 nm in a distance between the nanoparticles; and is three-dimensional structure of honeycomb shape formed by the nanoparticles or nanoparticle aggregates.

According to one embodiment of the present application, the nanoparticles may exhibit a positive zeta potential value.

According to one embodiment of the present application, the nanoparticles may have a mesopore volume of 0.1 cm$^3$/g to 0.2 cm$^3$/g and a surface area of 20 cm$^2$/g to 30 m$^2$/g.

According to one embodiment of the present application, the nanoparticles may exhibit a maximum absorbance at a wavelength of 190 nm to 400 nm, and may exhibit fluorescence at an excitation wavelength of 358 nm and an emission wavelength of 400 nm to 700 nm.

According to one embodiment of the present application, the nanoparticles may exhibit peaks of $E_2^{Low}$, $A_1^{Additional}$, $A_1^{TO}$, $E_2^{High}$, $A_1^{LO}$, $E_1^{LO}$, $A_1^{LO}+E_2^{High}$, $A_1^{2LO}+E_1^{2LO}$ and $A_1^{TO}+A_1^{LO}+E_1^{High}+E_2^{High}$ in the Raman spectrum.

According to one embodiment of the present application, the nanoparticles may exhibit the binding energy peaks of oxygen (O) at 530 eV and zinc (Zn) at 1,030 eV, 8,640 eV, and 9,570 eV in the energy dispersive X-ray spectroscopy (EDS).

One embodiment of the present application provides a bio-ink including the self-assembled porous three-dimensional zinc oxide nanoparticle structure.

Advantageous Effects

The present application provides a preparation method using a microfluidic device for synthesizing porous monodisperse zinc oxide nanoparticles, the prepared nanoparticles, aggregates thereof, and a three-dimensional structure thereof. The zinc oxide nanoparticles of the present application have micropores in the particles and mesopores between the particles, and form macropores while forming a three-dimensional structure through a fixing method on a support.

The zinc oxide nanoparticles of the present application have superior properties in terms of shape and particle size, particle size distribution, crystallinity and spectroscopic properties as compared to zinc oxide nanoparticle synthesized by conventional chemical reaction methods, precipitation methods, hydrothermal methods, and the like, and thus can be utilized as cosmetics, pharmaceuticals, photocatalysts, fuels, sensors, etc.

The effects of the present application are not limited to those mentioned above, and other effects not mentioned may be clearly understood by those skilled in the art from the following description.

MODES OF THE INVENTION

Figure 1:
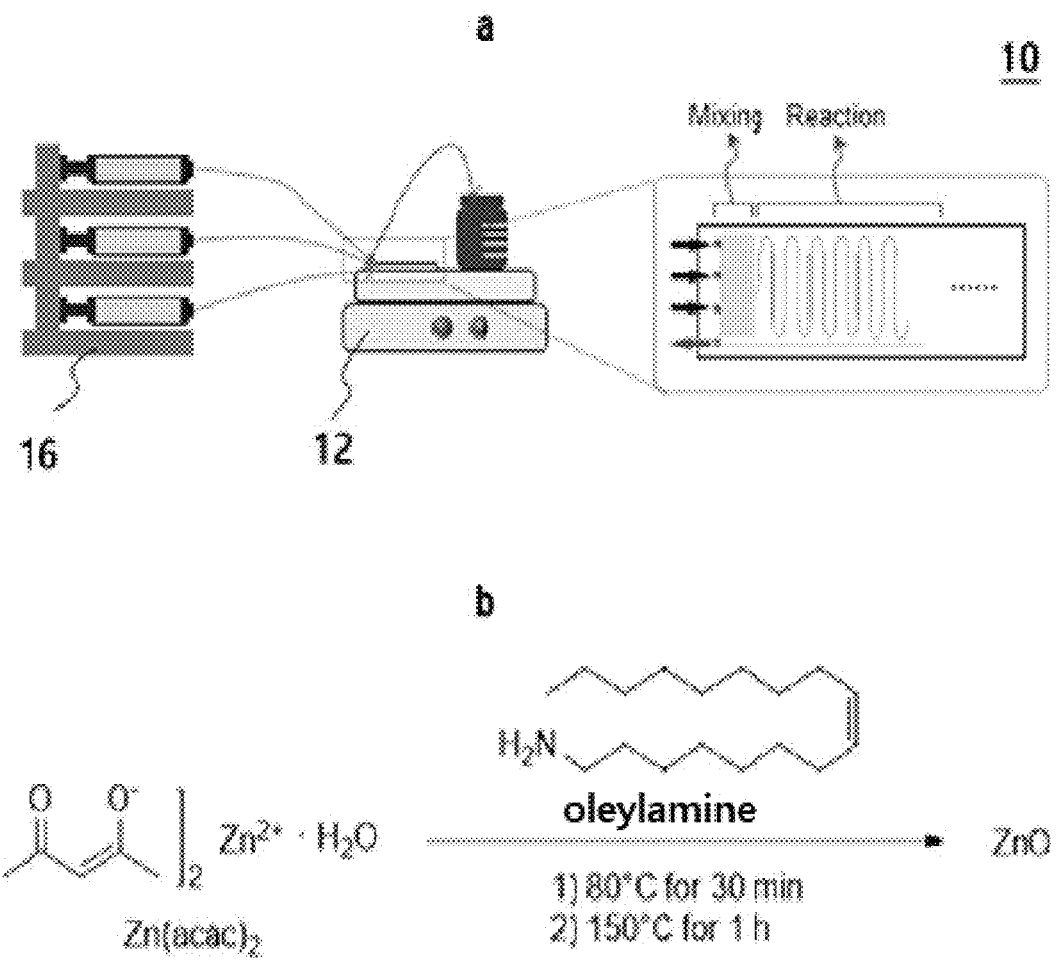
FIG. 1, panel (a) shows a schematic diagram of a synthesis method using a microfluidic device of zinc oxide nanoparticles (Example 1: MFD-2 ZnO) according to the present application, and FIG. 1, panel (b) shows the synthetic structural formula of zinc oxide nanoparticles (Comparative Example 1: Exp. 10 ZnO) prepared by a large-scale synthesis method using a single vessel.

Among the terms used in this application, "self-assembly" refers to a phenomenon in which atoms, molecules, nanoparticles, or several different nano-scale particles are spontaneously constructed by the energy (enthalpy) of a system, or the formation of a nanostructure having a three-dimensional structure by the phenomenon.

As used herein, "microfluidic device" also refers to a microfluidic reactor or reaction system, and refers to a synthetic reaction device or a chip device for driving a reaction system using a channel device with a size of tens to hundreds of microliters.

Among the terms used in the present application, "monodisperse" refers to a characteristic in which particles have a uniform size in a dispersed phase, and refers to uniformity of size and shape.

Hereinafter, embodiments of the present application will be described in detail. However, this is provided as an example, the present application is not limited thereby, and the present application is only defined by the scope of the claims to be described later. In particular, the present application may be implemented in several different forms, and is not limited to the embodiments and examples described herein.

Throughout the specification, when a portion is said to "include" a component, this means that the component may further include other components rather than excluding other components unless specifically stated to the contrary. In addition, in describing the components of the embodiment of the present application, terms such as first, second, A, B, (a), (b), etc. may be used. These terms are merely intended to distinguish one element from other elements, and the nature, sequence, or order of the elements is not limited by the term.

The terms "about," "substantially," and the like, as used throughout the specification of this application, are used in a sense at or near that value when the manufacturing and material tolerances inherent in the stated meaning are presented, and are used to prevent an unconscionable infringer from using the exact or absolute value to unfairly utilize the stated disclosure.

The present application is for preparing zinc oxide nanoparticles using a microfluidic device, providing the prepared zinc oxide nanoparticles, and showing potential applications through the properties of the prepared zinc oxide nanoparticles.

Zinc oxide nanoparticles prepared by using a microfluidic device according to the one embodiment of the present application are monodisperse nanoparticles of 100 nm or less having monodispersity, and may form a porous three-dimensional hierarchical network structure, specifically, a three-dimensional structure of honeycomb shape, on a support. This is a bio-ink, which can be used as a medical device, drug delivery carrier, sensor, etc. in the pharmaceutical field, or as a therapeutic agent or a treatment adjuvant by paying attention to the therapeutic effect of the particle itself, such as anti-inflammatory effect, anti-cancer effect, and antibiotic effect.

According to one embodiment of the present application, as illustrated in FIG. 1a, in the method of preparing zinc oxide nanoparticles using a microfluidic device, a dispersion is prepared by first mixing a zinc precursor and an amine compound.

The zinc precursor may be at least one selected from the group consisting of zinc acetate, zinc chloride, zinc sulfate, zinc citrate, zinc nitrate, zinc nitrate hexahydrate, zinc acetate dihydrate, zinc phosphate, zinc formate, zinc fluoride, zinc bromide, zinc iodide, zinc acetylacetonate, zinc hydroxide, diethyl zinc, dimethyl zinc, zinc peroxide, and zinc perchlorate specifically zinc acetate.

The amine compound may be at least one selected from the group consisting of an alkylamine having 6 to 20 carbon atoms, oleylamine, cocoamine, tallowamine, hydrogenated tallowamine, laurylamine, stearylamine, dihydrogenated tallowamine, distearylamine, dodecyldimethylamine, didodecylmonomethylamine, tetradecyldimethylamine, octadecyldimethylamine, cocodimethylamine, dodecyltetradecyldimethylamine, trioctylamine hexamethyleneamine, hexamethylenetetraamine, cyclohexylamine, monoethanolamine, diethanolamine, ethylenediamine, polyethyleneamine, naphthalenediamine, stearylpropylenediamine, octamethylenediamine, nonanediamine and triethanolamine, and specifically, an alkylamine having 6 to 20 carbon atoms, hexylamine, octylamine, decylamine, dodecylamine or oleylamine.

The zinc precursor dispersed in the amine compound may be 1.67% (w/v) or more, specifically 2.39% (w/v) or more, 3.57% (w/v) or less, specifically 2.5% (w/v) or less. Specifically, the weight-to-volume ratio of w/v may be mg/mL.

A step (first reaction) of generating nanoparticles by applying heat of a first temperature while introducing the dispersion generated in the preparation step of dispersion into the microfluidic channel in the microfluidic device may be performed.

A step (secondary reaction) of aggregating the nanoparticles may be performed by reacting the solution discharged from the microfluidic channel at a second temperature that is higher than the first temperature. At this time, the solution may be put in a separate vessel and reacted.

In the step of aggregating the nanoparticles, the structure of the microfluidic channel through which the reactant passes, is preferably determined in consideration of the passage time of the solution. The total length of the microfluidic channel affects the crystallinity and stability of nanoparticles. It is preferable that the total capacity or total volume of the microfluidic channel employed in the present application is about 200 μL to 300 μL. When the total volume of the microfluidic channel is less than 200 μL, the reaction to generate nanoparticles with micropores is not sufficient, and when the total volume is greater than 300 μL, the particle size may be large or may be produced in a rod-like shape.

In this case, in the step of generating the nanoparticles in the microfluidic channel (first reaction), the flow rate of the channel may be, for example, 0.05 mL/min to 0.2 mL/min. In addition, the reaction time within the microfluidic channel may be 20 to 40 minutes.

With respect to the flow rate of the microfluidic device, when it exceeds 0.2 mL/min, the viscosity of the amine compound may be high, and thus the fluid flow may be affected. When the flow rate is less than 0.05 mL/min, the channel passage is blocked due to overreaction in the channel, making it difficult to form suitable nanoparticles, rod-shaped or hexahedral particle shapes may appear. Also, the particles may be unstable.

The first temperature may be a temperature of 70° C. to 90° C. When the reaction is performed at 70° C. to 90° C. in a microfluidic device, spherical particles having a particle size of 100 nm or less are formed, and channel-type micropores having a diameter of 0.1 nm to 2 nm are formed in the particles. When the temperature is less than 70° C. or exceeds 90° C., problems such as micropores not being formed in the nanoparticles or particles with non-uniform shapes occur.

The reaction time in the step (secondary reaction) of aggregating the nanoparticles may be 50 minutes to 100 minutes, specifically 55 minutes to 70 minutes, more specifically 60 minutes to 65 minutes.

The second temperature may be a temperature of 140° C. to 180° C., specifically, 145° C. to 155° C.

In the aggregation reaction step, the nanoparticles are aggregated to form mesopores having an inter-particle distance of 2 nm to 50 nm.

When the crystallinity of the particles is improved in the aggregation reaction step, stability can be improved. When the reaction temperature is less than 140° C., it is difficult to form a precipitate of particle aggregates, and when it exceeds 180° C., the reactant may be altered or reactivity may be reduced.

In the aggregation reaction step, the nanoparticles are aggregated to form mesopores having an inter-particle distance of 2 nm to 50 nm. The mesopores may have a volume of 0.1 $cm^3/g$ to 0.2 $cm^3/g$, and a surface area of 20 $m^2/g$ to 30 $m^2/g$, specifically 25.96 $m^2/g$ to 26.24 $m^2/g$.

Therefore, in the present application, zinc oxide nanoparticles are prepared by secondarily reacting the solution discharged after the first reaction in the microfluidic device, and the shape and size of the nanoparticles can be uniform by differently controlling and adjusting the reaction time and temperature of the first reaction and the second reaction. In addition, micropores may mainly formed in the first reaction, and mesopores may be formed in the second reaction. In addition, in zinc oxide nanoparticles (Comparative Example 1: In Exp. 10 ZnO) prepared by a large-scale synthesis method using a single vessel, when reacting at the first temperature and the second temperature in a one-pot manner of a reaction vessel, inter-particle mesopores are formed without intra-particle micropores, and long rod shaped particles can be produced.

After the step of aggregating the nanoparticles, a step of obtaining nanoparticles by mixing the reaction solution and a C1-C4 alcohol and drying the precipitates may be performed. Here, the precipitates can be obtained using a centrifugation method, and the precipitates can be rinsed several times with a $C_1$~$C_4$ alcohol and dried to prepare zinc oxide nanoparticles.

The alcohol used to generate the precipitates, the alcohol may be at least one selected from the group consisting of methanol, ethanol, butanol, isopropyl alcohol, propanol, ethylene glycol and propylene glycol.

After the step of obtaining the nanoparticles, the step of forming a three-dimensional nanostructure by reacting the organic solvent dispersion of the nanoparticles in an organic solvent at 40° C. to 60° C. may be further performed. When the reaction temperature is less than 40° C., reactivity is reduced, and when it exceeds 60° C., there is a possibility of deformation and damage of the three-dimensional structure creation, which is inappropriate.

When the nanoparticles or aggregates are immobilized on a support through the reaction, a three-dimensional structure having macropores in an inter-nanoparticle distance or an inter-nanoparticle aggregate distance of 50 nm to 2.5 μm may be formed, and in this case, the shape of the three-dimensional structure formed after evaporation of the organic solvent on the support may be a honeycomb shape.

The content of the nanoparticle aggregates in the organic solvent may be included in a weight-to-volume ratio of 2 w/v to 10 w/v. Specifically, the amount of the nanoparticle aggregates may be 2 mg to 10 mg based on 1 mL of the organic solvent. When the amount of the nanoparticle aggregates is less than 2 mg based on 1 mL of the organic solvent, it may still be difficult to form a hierarchical porous three-dimensional structure, and when the amount of the nanoparticle aggregates is more than 10 mg based on 1 mL of the organic solvent, there is a problem in that macropores are not adequately formed and the coating property on the support is more prominent than the formation of a hierarchical porous three-dimensional structure. The nanoparticles used at this time can be used by dividing into a wet method and a dry method. In the wet method, zinc oxide nanoparticles (wMFD-2 ZnO) in the form of ethanol paste are used after nanoparticle synthesis in a microfluidic device, and in the dry method, after nanoparticles are synthesized in a microfluidic device, the dried zinc oxide nanoparticle (dMFD-2 ZnO) can be used.

The organic solvent may be at least one selected from the group consisting of hexane, methylene chloride, chloroform, benzene, toluene, xylene, isopropyl ether, triethylamine, heptane, octane, nonane, decane, isobutyl isobutyrate, tributylamine, undecane, 2,2,4-trimethylpentylacetate, isobutyl heptyl ketone, diisobutyl ketone, cyclopentane, cyclohexane, isobutylbenzene and ethylbenzene, and specifically hexane.

Characteristics of zinc oxide nanoparticles prepared by a synthesis method using a microfluidic device according to an embodiment of the present application and their structures were identified by field emission scanning electron microscopy (FE-SEM) with energy dispersive X-ray spectroscopy (EDS), Fourier transform infrared spectroscopy (FT-IR), zeta potential analysis, field emission transmission electron microscopy (FE-TEM) with energy dispersive X-ray spectroscopy (EDS), X-ray photoelectron spectroscopy (XPS), Raman spectroscopy, ultraviolet (UV)-visible (Vis) spectrophotometry, adsorption and photocatalytic reaction analysis, fluorescence analysis, Brunauer-Emmett-Teller (BET) analysis, and atomic force microscopy (AFM).

The zinc oxide nanoparticles prepared by the synthesis method using a microfluidic device according to the present application are spherical nanoparticles of 100 nm or less, and form a three-dimensional hierarchical porous network structure on a support including, for example, a silicon wafer or filter paper, and may exhibit a positive zeta potential value. In addition, the nanoparticles have channel-type micropores having a diameter of 0.1 nm to 2 nm in the nanoparticles. In addition, the nanoparticles may be aggregated to form an aggregate including mesopores having an inter-nanoparticle distance of 2 nm to 50 nm. In addition, the three-dimensional structure formed between the nanoparticles or aggregates of nanoparticles may include macropores having an inter-nanoparticle distance of 50 nm to 2.5 μm.

In addition, the crystallinity of zinc oxide nanoparticles conforming to JCPDS 36-1451 can be confirmed by d-spacing analysis on a field emission transmission electron microscope (FE-TEM) image.

In addition, the zinc oxide nanoparticles according to one embodiment of the present application may exhibit binding energy peaks of carbon (C) at 280 eV, oxygen (O) at 530 eV, and zinc (Zn) at 1,030 eV, 8,640 eV and 9,570 eV on an energy dispersive X-ray spectroscopy (EDS) profile, and also peaks of Zn2p and O1s on an XPS spectrum. In Raman spectroscopy, peaks of $E_2^{Low}$, $A_1^{Additional}$, $A_1^{TO}$, $E_2^{High}$, $A_1^{LO}$, $E_1^{LO}$, $A_1^{LO}+E_2^{High}$, $A_1^{2LO}+E_1^{2LO}$ and/or $A_1^{TO}+A_1^{LO}+E_1^{High}+E_2^{High}$ may be exhibited.

In addition, the zinc oxide nanoparticles according to the one embodiment of the present application may exhibit an absorption peak in the ultraviolet (UV)-visible (Vis) region, for example, a maximum absorbance at a wavelength of 190 nm to 400 nm. In addition, a dye can be adsorbed, and the dye can be degraded by a photocatalytic reaction when irradiated with ultraviolet (UV) rays. When compared with the conventional zinc oxide nanoparticles, the absorbance of the dye may be markedly reduced when irradiated with ultraviolet (UV) light due to photocatalytic activation during the formation of aggregates.

The zinc oxide nanoparticles according to the one embodiment of the present application may exhibit fluorescence.

The zinc oxide nanoparticles prepared by the synthesis method using the microfluidic device according to the one embodiment of the present application form a three-dimensional porous network structure of a net-shaped honeycomb structure when observed using an atomic force microscope (AFM), and thus may exhibit roughness and topology properties which can be identified.

According to one embodiment of the present application, it is possible to confirm the formation of a three-dimensional self-assembled porous network structure of zinc oxide nanoparticles (MFD-2 ZnO) on a support, which were prepared by a synthesis method using a microfluidic device. The method for immobilizing zinc oxide nanoparticles (MFD-2 ZnO) on a support, which were prepared by a synthesis method using a microfluidic device, may include a method in which 2 mg to 10 mg of zinc oxide nanoparticles are dispersed in an organic solvent, for example, hexane, specifically, 1 mL of hexane, then diluting again with hexane, dropping each concentration of zinc oxide nanoparticle suspensions on a support, followed by drying at 40° C. to 60° C., preferably 50° C. After confirming the evaporation of the organic solvent, this can be repeated continuously. Here, when the temperature exceeds 60° C., it is preferable to perform drying within the above temperature range because the three-dimensional network collapse of the zinc oxide nanoparticles and the damage to the used support occur.

In this case, the wet method may be a method using zinc oxide nanoparticles (wMFD-2 ZnO) in the form of ethanol paste after synthesizing nanoparticles in a microfluidic device, and the dry method may be a method of synthesizing nanoparticles in a microfluidic device, drying them, and then coating or immobilizing them on a support using zinc nanoparticles (dMFD-2 ZnO) in the form of dry powder.

Here, the support may be a solid plate including a silicon wafer or filter paper.

Figure 5:
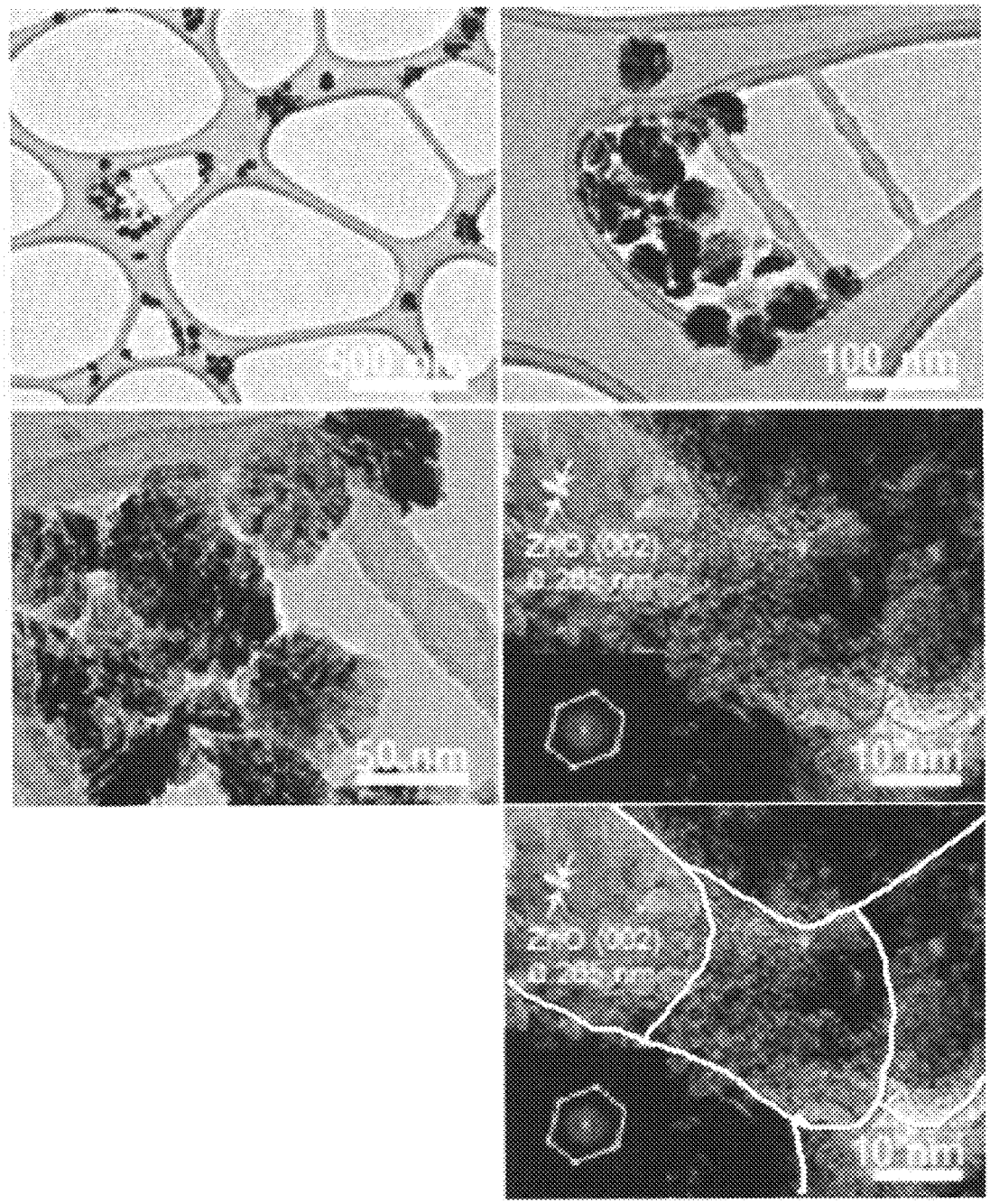
FIG. 5 shows field emission transmission electron microscope (FE-TEM) images of zinc oxide nanoparticles (Example 1: MFD-2 ZnO) prepared by a synthesis method using a microfluidic device according to the present application.

FIG. 5 shows field emission transmission electron microscope (FE-TEM) images of zinc oxide nanoparticles (MFD-2 ZnO) prepared by a synthesis method using a microfluidic device according to the present application, it can be seen that the image matches d-spacing of JCPDS 36-1451, and both micropores and mesopores are present.

According to the right micrograph of the upper part of FIG. 5, it can show that the size of the zinc oxide nanoparticles that are aggregated in a circle is 100 nm or less, and according to the right micrograph of the lower part, the micropores of the zinc oxide nanoparticles are formed like channel-shape from intraparticle cores (purple line).

Modes for Carrying Out the Invention

Hereinafter, for examples, Comparative Examples and Experimental Examples, the zinc oxide nanoparticle synthesis compositions according to the present application, the method for synthesizing zinc oxide nanoparticles using a microfluidic device, the properties of the synthesized nanoparticles, and the immobilization method on the support will be described in more detail, but the scope of the present application is not necessarily limited only to these examples.

Preparation of Chemicals

Zinc acetate [Zn(acac)$_2$], alkylamine, oleylamine, isopropyl alcohol, and hexane were purchased from Sigma, and ethanol was purchased from Merck. Other reagents were used at or above grade for reagents without further purification, and deionized distilled water was used for water.

Example 1: Synthesis of Zinc Oxide Nanoparticles Using a Microfluidic Device

Zinc acetate [Zn(acac)$_2$] at 1.67% (mg/mL) and 2.5% (mg/mL) was respectively dispersed in oleylamine, and as illustrated in FIG. 1a, after passing through a chemical microfluidic reaction chip (Dolomite, Blacktrace Holdings Ltd., Royston, UK: 12) at 80° C. for 30 minutes, the discharged dispersion was reacted at 150° C. in a separate vessel for 60 minutes. The flow rate in the microfluidic reaction chip was controlled to 0.1 mL/min by a syringe pump (KD Scientific, Secrim Lab Tech, Seoul, Korea:16) equipped with a multi-rack (KD Scientific). After cooling to room temperature, the mixture was put into 50 mL of ethanol as an organic solvent, and the resulting white precipitates were with 50 mL of ethanol by centrifugation 3 times and dried.

Comparative Example 1: Large-Scale Synthesis of Zinc Oxide Nanoparticles in a Single Vessel As illustrated in FIG. 1B, in the case of Comparative Example 1 (Exp. 10 ZnO) used as an example of large-scale synthesis using a single vessel, 0.225 g of zinc acetate [Zn(acac)$_2$] was weighed and then dispersed in 6 mL of oleylamine, heated at 80° C. for 30 minutes, and left at 150° C. for 60 minutes. After cooling to room temperature, the resulting white precipitates were added to 50 mL of ethanol, rinsed 3 times with ethanol and dried.

Comparative Example 2: Nano-Sized Single Nanoparticles

Hexagonal zinc oxide nanoparticles (nano-ZnO) were purchased from Sigma.

Comparative Example 3: Multiscale Particles

Zinc oxide particles (hybrid-ZnO) mixed with nano- and micro-sized particles were purchased from Sigma. The shape of the particles was a mixture of hexagonal, rod-shaped, and needle-shaped structures.

Experimental Example 1: Array of Zinc Oxide Nanoparticles 1-1) Formation of Aggregates Aggregate powder of zinc oxide nanoparticles was prepared in advance by dispersing a suspension of zinc oxide nanoparticles in hexane at 50° C. for 24 hours and drying.

1-2) Formation of a Porous Network Structure on a Silicon Wafer

The silicon wafer was rinsed with isopropanol and ethanol, respectively, and each solvent was removed. After dispersing 0.5 mg of zinc oxide nanoparticles in hexane, it was dropped onto the silicon wafer, and dried at room temperature or 50° C. for evaporation of hexane, respectively. This was repeated successively after evaporation of hexane. At this time, depending on whether the zinc oxide nanoparticles used are dried, it can be divided into a wet method and a dry method. The wet method may be a method using zinc oxide nanoparticles in the form of ethanol paste after synthesizing nanoparticles in a microfluidic device, and the dry method may be a method used after synthesizing nanoparticles in a microfluidic device and drying them.

1-3) Use as Bio-Ink on Paper

Zinc oxide nanoparticles at 5 mg were dispersed in hexane, and this was serially diluted with hexane by twofold. A dispersion for each concentration of the zinc oxide nanoparticles was dropped onto filter paper, respectively, and dried at 50° C. for rapid evaporation of the organic solvent. This was repeated successively after evaporation of the organic solvent. At this time, among the wet method and the dry method used, the wet method may be a method using zinc oxide nanoparticles in the form of ethanol paste after synthesizing nanoparticles in a microfluidic device, and the dry method may be a method used after synthesizing nanoparticles in a microfluidic device and drying them.

Experimental Example 2: Characterization of Zinc Oxide Nanoparticles 2-1) Field Emission Scanning Electron Microscopy (FE-SEM) with Energy Dispersive X-Ray Spectroscopy (EDS)

Using a field emission scanning electron microscope (FE-SEM) (S-4300SE, Hitachi, Co. Ltd., Japan), the magnification was increased from 100 to 50,000× at an accelerating voltage of 15.0 kV, and the samples after platinum coating were checked. Field emission scanning electron microscope (FE-SEM) images were analyzed using Image J (NIH). In the case of energy dispersive X-ray spectroscopy (EDS) analysis, the sample before platinum coating was irradiated.

Figure 2:
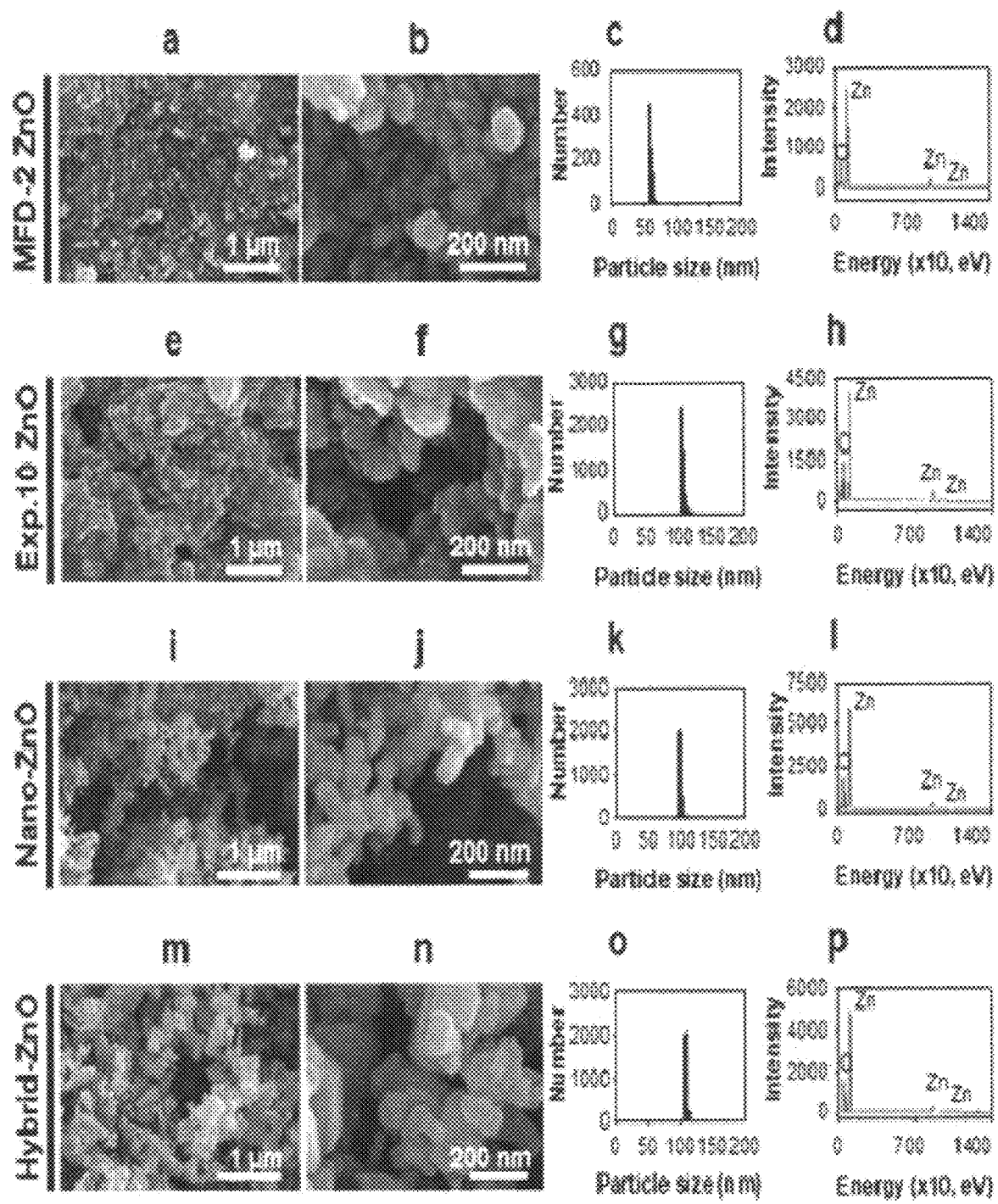
FIG. 2 shows field emission scanning electron microscope (FE-SEM) images of zinc oxide nanoparticles (Example 1: MFD-2 ZnO) prepared by a synthesis method using a microfluidic device according to the present application, FE-SEM images of zinc oxide nanoparticle of Comparative Examples 1 to 3 (Comparative Example 1: Exp. 10 ZnO; Comparative Example 2: nano-ZnO; Comparative Example 3: hybrid-ZnO), particle size distribution plots and energy dispersive X-ray spectroscopy (EDS) profiles.

FIG. 2 includes field emission scanning electron microscope (FE-SEM) images, particle size distribution plots, and energy dispersive X-ray spectroscopy (EDS) profiles of the zinc oxide nanoparticles synthesized using a microfluidic device (Example 1: MFD-2 ZnO) or using a single vessel at large scale (Comparative Example 1: Exp. 10 ZnO), and the conventional ZnO particles (Comparative Example 2: nano-ZnO; Comparative Example 3: hybrid-ZnO), and their characteristics were comparatively analyzed. FIGS. 2a to 2d show zinc oxide nanoparticles (Example 1: MFD-2 ZnO)

prepared by a synthesis method using a microfluidic device according to the present application, and FIGS. 2e to 2h show zinc oxide nanoparticles (Comparative Example 1: Exp. 10 ZnO) prepared by a large-scale synthesis method using a single vessel, FIGS. 2i to 2l show conventional zinc oxide nanoparticles (Comparative Example 2: nano-ZnO) used as a control, and FIGS. 2m to 2p show nano-to-micro-sized conventional zinc oxide particles (Comparative Example 3: hybrid-ZnO) used as a control.

As illustrated in FIGS. 2a to 2d, it can be confirmed that Example 1 (MFD-2 ZnO) of zinc oxide nanoparticles was prepared by a synthesis method using a microfluidic device, and Comparative Example 1 (Exp. 10 ZnO) of zinc oxide nanoparticles was prepared by a large-scale synthesis method using a single vessel. It can be confirmed that Comparative Example 2 (nano-ZnO) of zinc oxide nanoparticles had a quadrangular or hexagonal shape, and Comparative Example 3 (hybrid-ZnO) of zinc oxide nanoparticles was a mixture of tetragonal, hexagonal and needle-like shapes.

Compared with Comparative Examples 1 to 3, it can be confirmed that Example 1 (MFD-2 ZnO) had a spherical shape, and the particle size was reduced, and the binding energy peaks of oxygen (O) at 530 eV and zinc (Zn) at 1,030 eV, 8,640 eV and 9,570 eV were shown in all of the energy dispersive X-ray spectroscopy (EDS) profiles.

2-2) Fourier Transform Infrared Spectroscopy (FT-IR)

The sample was mixed with potassium bromide (KBr) and analyzed by recording the infrared (IR) spectrum region of 3,800~600 $cm^{-1}$ in a Fourier transform infrared (FT-IR) vacuum spectrometer (Bruker Vertex 80v, Bruker Optics, Inc., Billerica, Mass., USA) in the form of a disk. The frequency of each spectrum was 0.01 $cm^{-1}$ accuracy.

Figure 3:
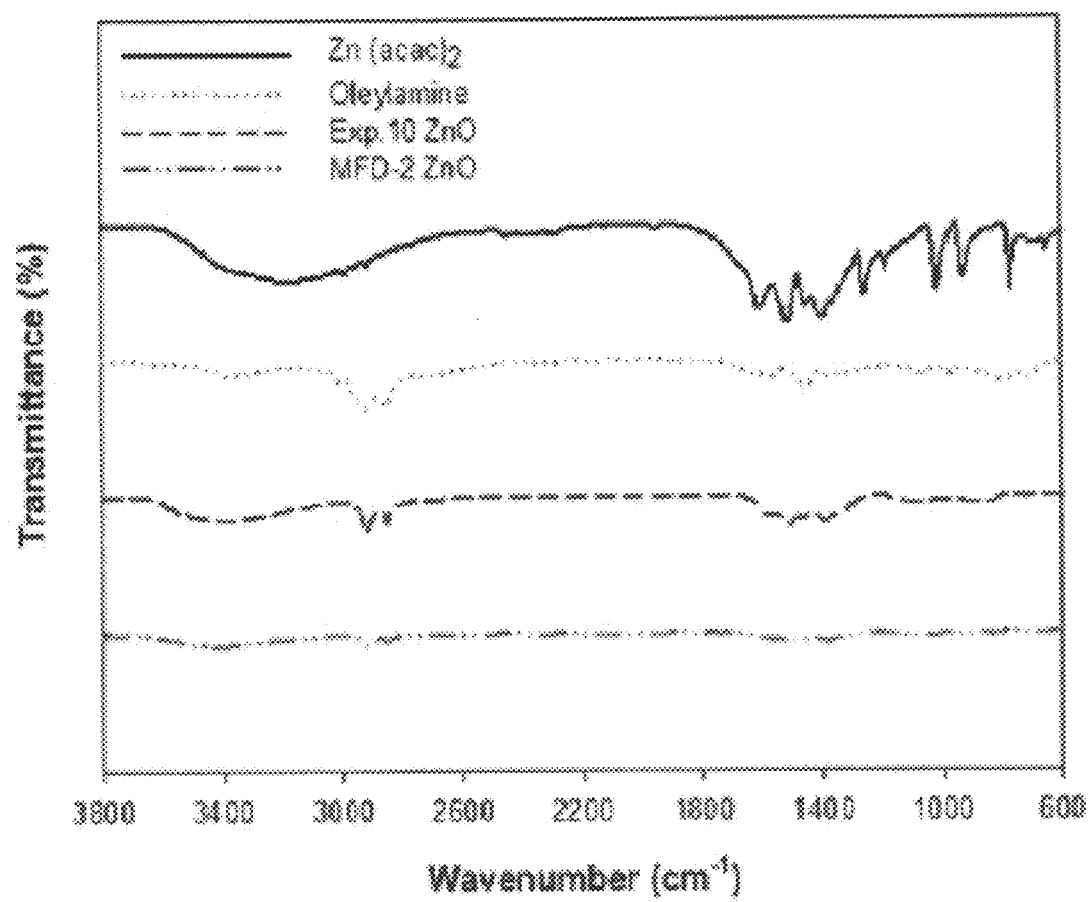
FIG. 3 shows Fourier transform infrared spectroscopy (FT-IR) profiles of zinc oxide nanoparticles (Example 1: MFD-2 ZnO) prepared by a synthesis method using a microfluidic device according to the present application, and zinc oxide nanoparticles (Comparative Example 1: Exp. 10 ZnO) synthesized on a large-scale using a single vessel, and the synthesis reactants.

FIG. 3 of the accompanying drawings shows the zinc oxide nanoparticles (Example 1: MFD-2 ZnO) prepared by a synthesis method using a microfluidic device according to the present application, and the zinc oxide nanoparticles (Comparative Example 1: Exp. 10 ZnO) synthesized on a large-scale using a single vessel, and the Fourier transform infrared spectroscopy (FT-IR) profile measured for the synthesis reactants.

According to FIG. 3, compared with Fourier transform infrared spectroscopy (FT-IR) result of the zinc oxide nanoparticles (Exp. 10 ZnO) synthesized on a large-scale of Comparative Example 1, it can be seen that peaks and bands appear, but the zinc oxide nanoparticles (MFD-2 ZnO) of Example 1 prepared by the synthesis using a microfluidic device had the characteristics that peaks and bands are hardly observed. Spectra of zinc acetate [$Zn(acac)_2$] and oleylamine used as reactants were also compared and analyzed.

According to FIG. 3, it was confirmed that pure zinc oxide nanoparticles with a smaller particle size and stability were generated using a microfluidic synthesis compared with large-scale synthesis in a single vessel.

2-3) Zeta Potential Measurement

The zeta potential was measured at room temperature by a light scattering method (ELS-Z, Otsuka Electronics, Ltd., Tokyo, Japan) using a standard cell. The zinc oxide nanoparticle suspension in ethanol was diluted with ethanol to reach an appropriate measurement strength and then analyzed. The zeta potential value was calculated using the Huckel equation and the average zeta potential (mV) was determined using ELS-Z software (Otsuka Electronics Co., Ltd.).

Figure 4:
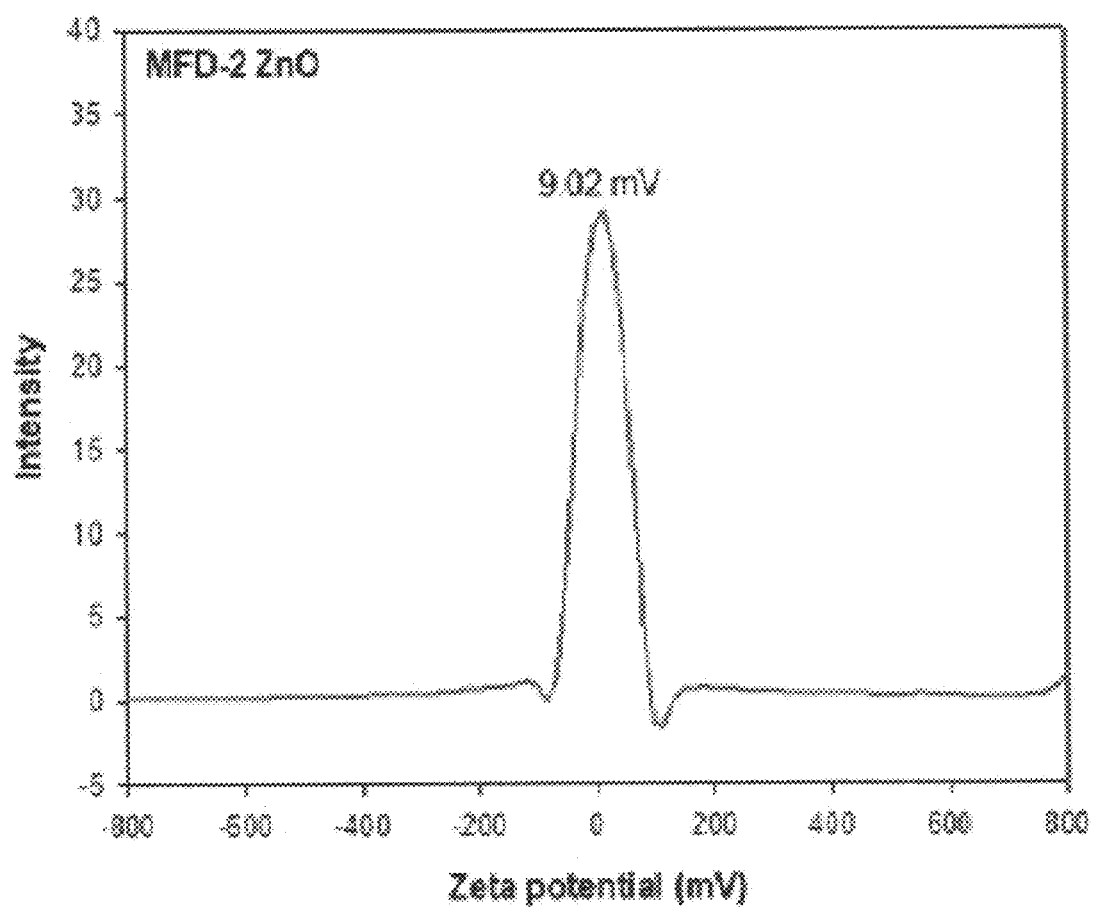
FIG. 4 shows the zeta potential distribution profile of zinc oxide nanoparticles (Example 1: MFD-2 ZnO) prepared by a synthesis method using a microfluidic device according to the present application.

FIG. 4 shows the zeta potential distribution plot of zinc oxide nanoparticles (Example 1: MFD-2 ZnO) prepared by a synthesis method using a microfluidic device according to the present application.

According to FIG. 4, the average zeta potential value was 9.02 mV, which was positive, and the mobility and Doppler shift were $2.303 \times 10^{-5}$ $cm^2/Vs$ and $-2.54$ Hz, respectively. It can be seen that the zinc oxide nanoparticles prepared according to the method of the present application had excellent stability.

2-4) Field Emission Transmission Electron Microscopy (FE-TEM) with Energy Dispersive X-Ray Spectroscopy (EDS)

Zinc oxide nanoparticles were observed at 100-100,000× magnification at an accelerating voltage of 200 kV under a field emission transmission electron microscope (FE-TEM, JEM-2100F, Jeol, Co., Peabody, Mass., USA). The zinc oxide nanoparticle sample was prepared by suspending in hexane and dropping on a copper polygrid (300 mesh), and it was confirmed after drying in a dark place. Field emission transmission electron microscope (FE-TEM) images were analyzed with Gatan microscopy suite software (Gatan, Inc., Pleasanton, Calif., USA). Energy dispersive X-ray spectroscopy (EDS) was also performed.

Figure 6A:
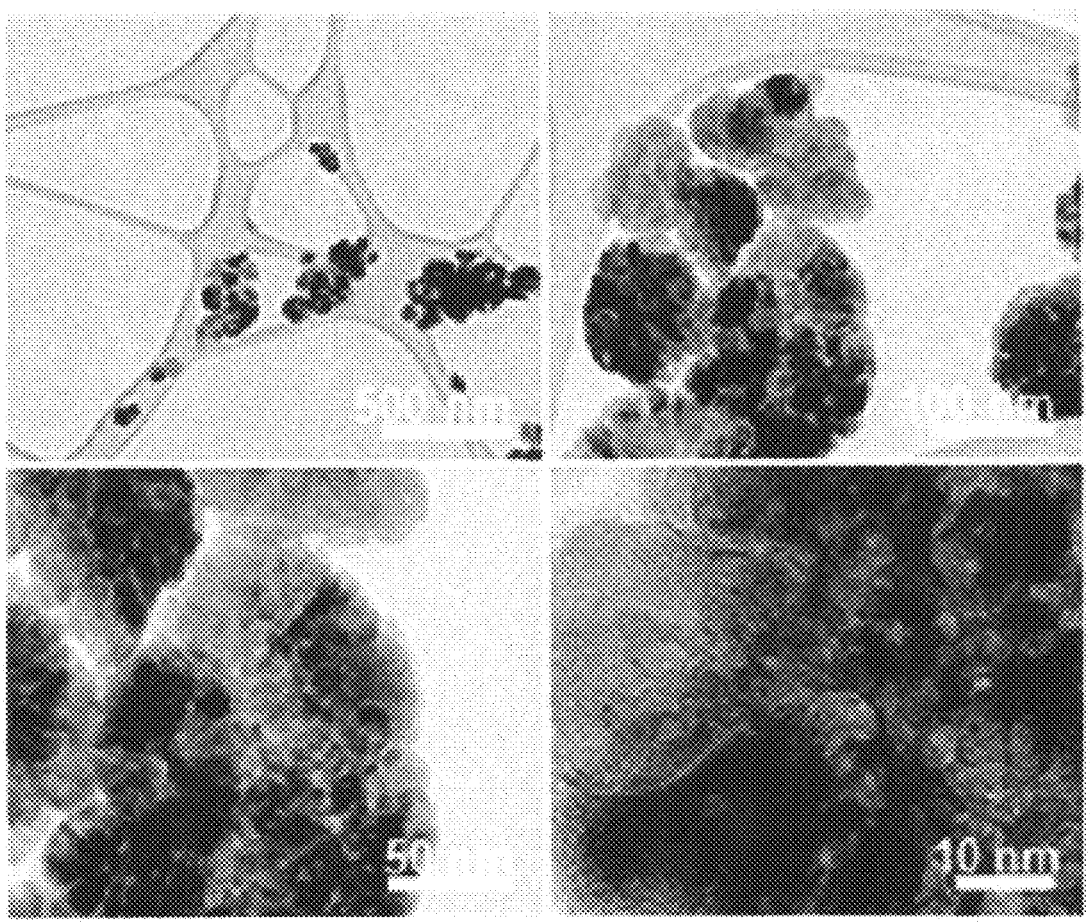
FIG. 6A to 6C show field emission transmission electron microscope (FE-TEM) images of zinc oxide nanoparticles of Comparative Examples 1 to 3 with respect to zinc oxide nanoparticles (Example 1: MFD-2 ZnO) prepared by a synthesis method using a microfluidic device according to the present application.
Figure 6B:
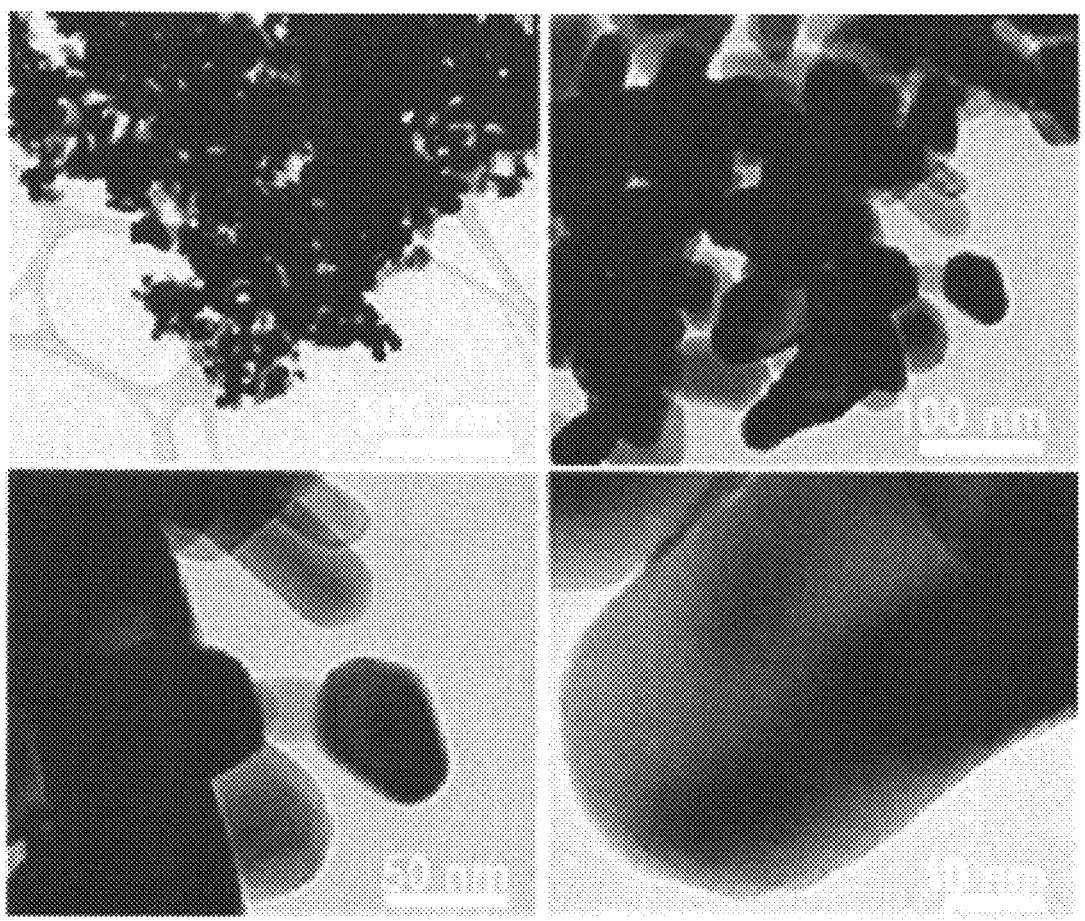
Figure 6C:
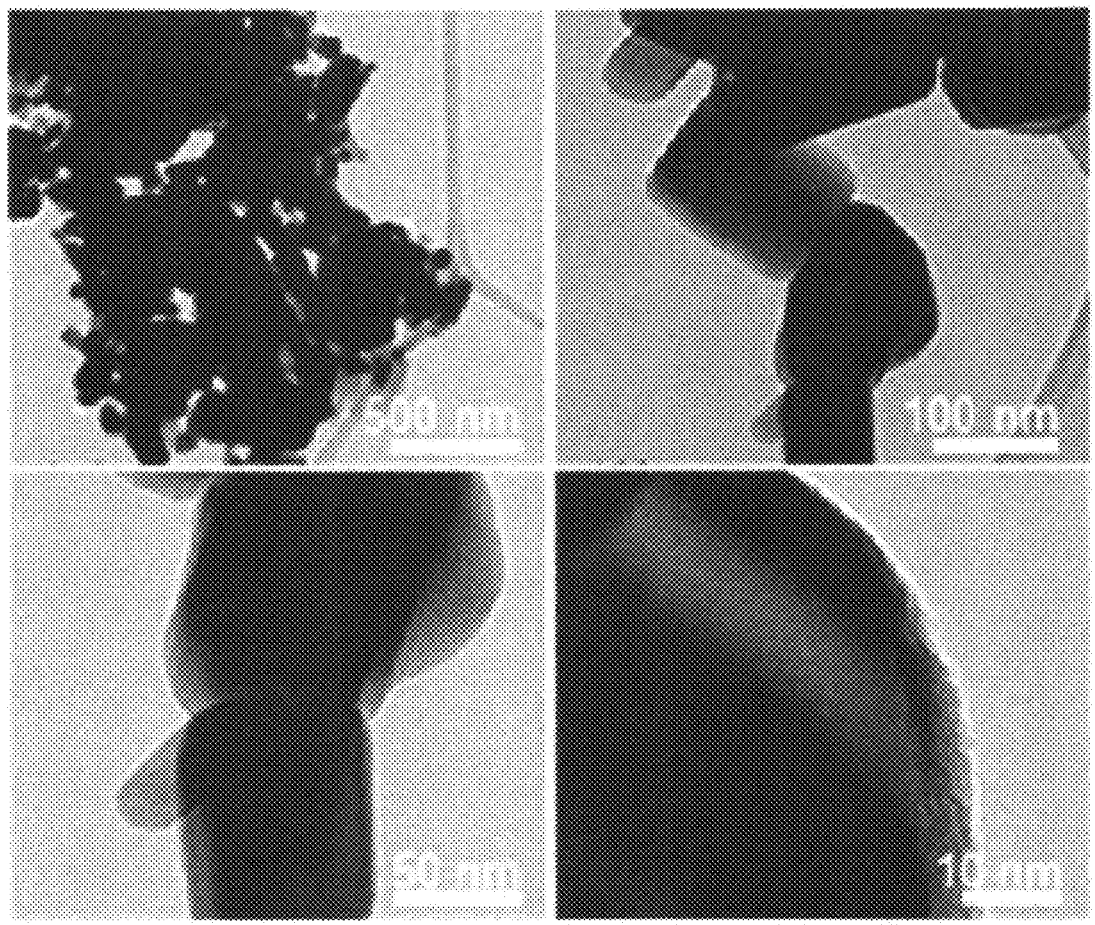

FIG. 5 shows a field emission transmission electron microscope (FE-TEM) image of zinc oxide nanoparticles (Example 1: MFD-2 ZnO) prepared by a synthesis method using a microfluidic device according to Example 1. FIG. 6A shows a field emission transmission electron microscope (FE-TEM) image of zinc oxide nanoparticles (Comparative Example 1: Exp. 10 ZnO) prepared by a large-scale synthesis method using a single vessel. FIG. 6B shows a field emission transmission electron microscope (FE-TEM) image of zinc oxide nanoparticles (nano-ZnO) of Comparative Example 2. FIG. 6C shows a field emission transmission electron microscope (FE-TEM) image of conventional nano-to-micro-sized zinc oxide particles (hybrid-ZnO) of Comparative Example 3.

In Example 1 of FIG. 5, it was found that there were channel-type micropores from the cores in the particles and mesopores between the particles.

In the zinc oxide nanoparticles (Example 1: MFD-2 ZnO) of Example 1, micropores in the particles can be confirmed on field emission transmission electron microscope (FE-TEM) images. In particular, according to the upper right image of FIG. 5, it can be seen that the spherical zinc oxide nanoparticles had a nanoscale size of 100 nm or less, and according to the lower right image of FIG. 5, micropores in the zinc oxide nanoparticles were channel-shaped (connecting lines).

For comparison with Example 1 of FIG. 5, referring to FIG. 6A, it can be seen that zinc oxide nanoparticles (Comparative Example 1: Exp. 10 ZnO) prepared by a large-scale synthesis method using a single vessel had a non-smooth surface, and structurally, there were mesopores without micropores. According to Comparative Example 2 and Comparative Example 3 of FIGS. 6B and 6C, it can be seen that most pores were hardly found, and most of them were present as aggregates.

2-5) Field Emission Scanning Electron Microscopy (FE-SEM), and Field Emission Transmission Electron Microscopy (FE-TEM) with Energy Dispersive X-Ray Spectroscopy (EDS)

Field emission scanning electron microscopy (FE-SEM), and field emission transmission electron microscopy (FE-TEM) with energy dispersive X-ray spectroscopy (EDS) were performed in the manner described above.

Figure 7:
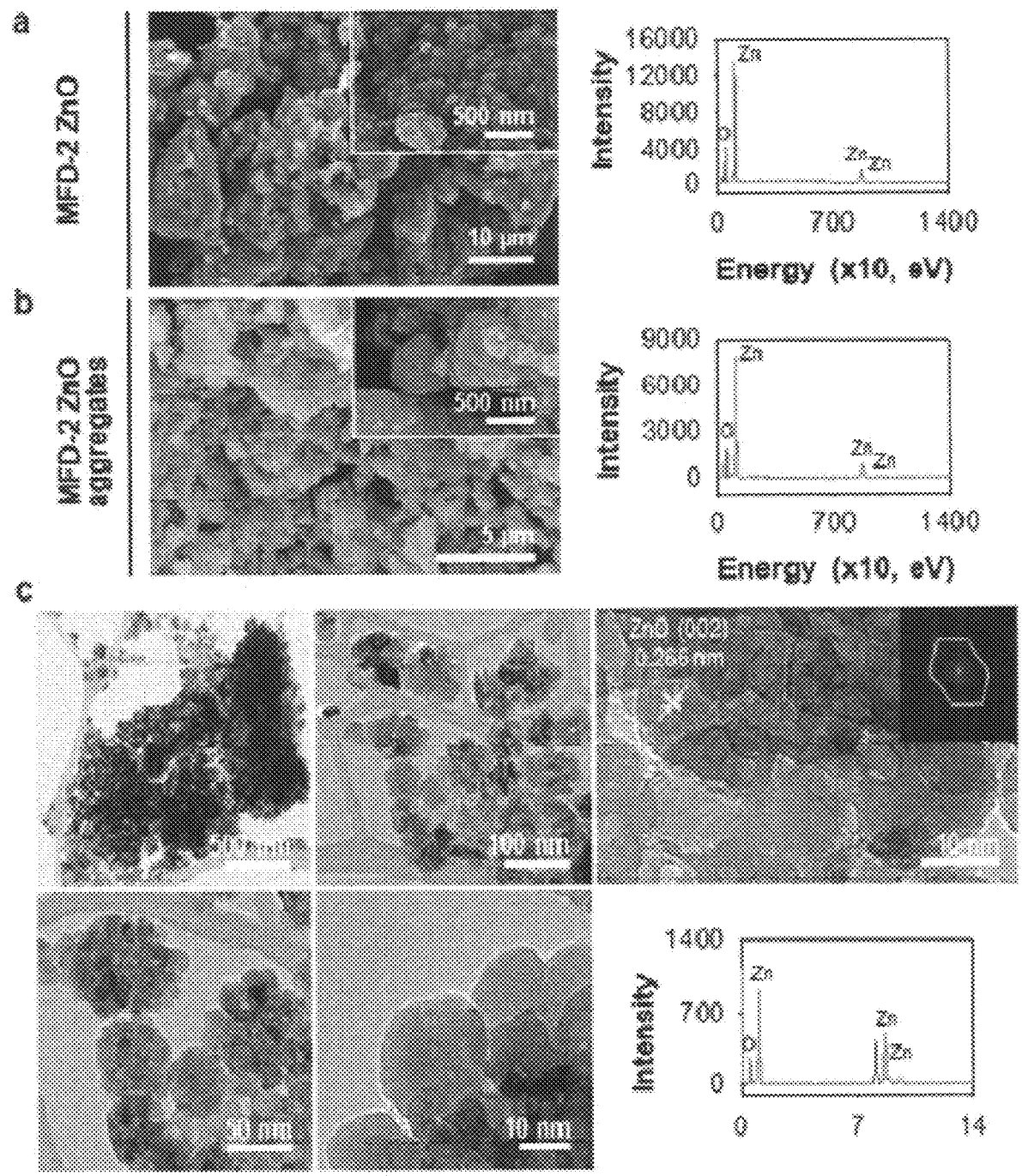
FIG. 7 shows analysis results of zinc oxide nanoparticles (Example 1: MFD-2 ZnO) prepared by a synthesis method using a microfluidic device according to the present application and aggregates thereof using field emission transmission electron microscopy (FE-SEM) and field emission transmission electron microscopy (FE-TEM) with energy dispersive X-ray spectroscopy (EDS).

FIG. 7 shows the analysis result of zinc oxide nanoparticles (Example 1: MFD-2 ZnO) prepared by a synthesis method using a microfluidic device according to the present application and aggregates thereof. FIGS. 7a and 7b shows field emission scanning electron microscope (FE-SEM) images and energy dispersive X-ray spectroscopy (EDS) profiles, and FIG. 7c shows field emission transmission electron microscope (FE-TEM) images and energy dispersive spectroscopy (EDS) profile of the aggregates. In addition, FIGS. 7a and 7b-c show the results for the zinc oxide nanoparticles (MFD-2 ZnO) of Example 1 and aggregates thereof, respectively.

FIGS. 7b and 7c show spherical crystalline aggregates that formed a porous network after drying, and binding energy peaks of oxygen (O) at 530 eV and zinc (Zn) at 1,030 eV, 8,640 eV and 9,570 eV in energy dispersive X-ray spectroscopy (EDS) profiles.

2-6) X-Ray Photoelectron Spectroscopy (XPS)

Zinc oxide nanoparticles and aggregates thereof were identified by X-ray photoelectron spectroscopy (XPS) of monochromatic Al K-alpha (K-Alpha, Thermo Scientific, Thermo Fisher Scientific Inc., USA).

Figure 8:
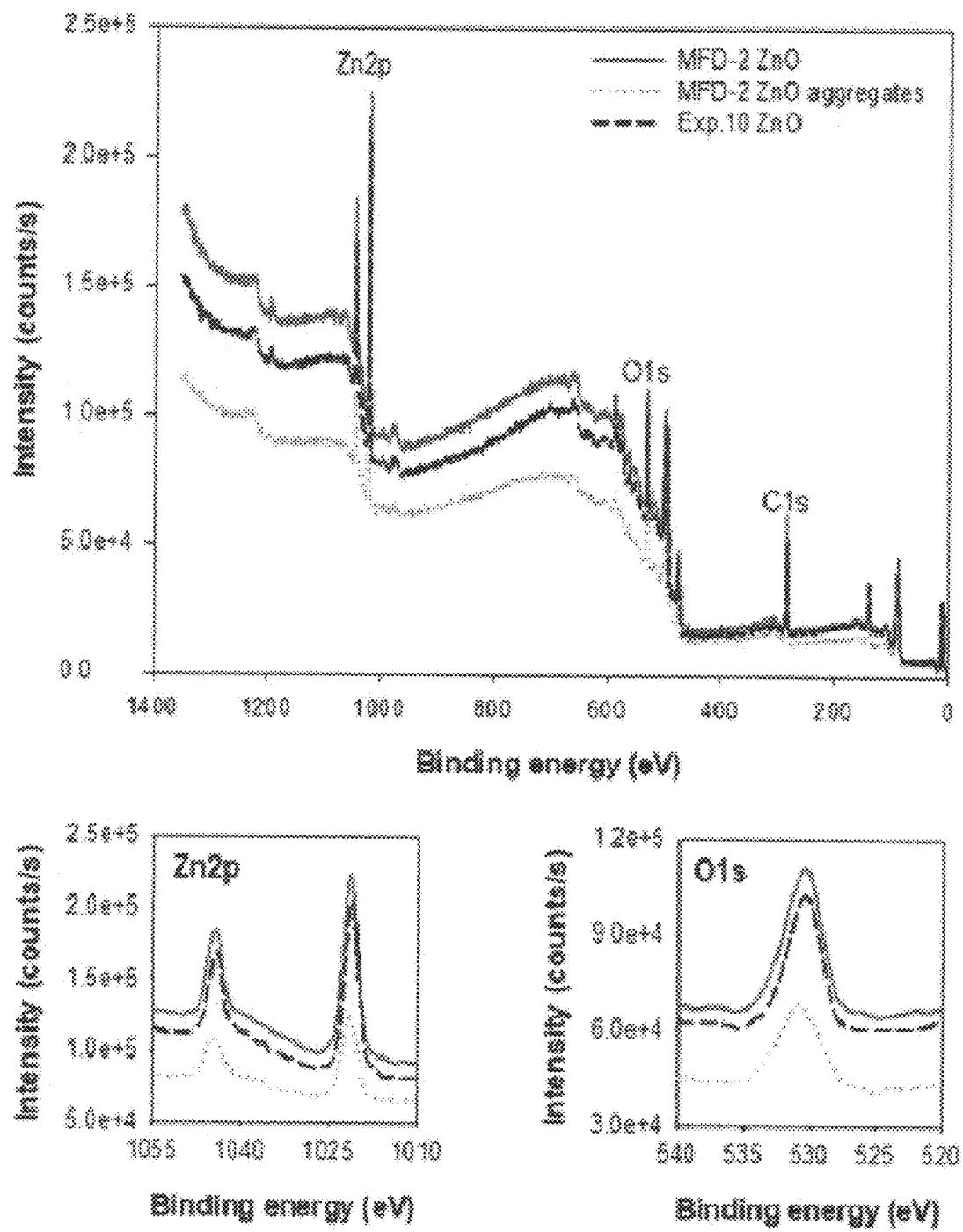
FIG. 8 shows X-ray photoelectron spectroscopy (XPS) profiles of zinc oxide nanoparticles (Example 1: MFD-2 ZnO) prepared by a synthesis method using a microfluidic device according to the present application and aggregates thereof, and zinc oxide nanoparticles (Comparative Example 1: Exp. 10 ZnO) prepared by a large-scale synthesis method using a single vessel.

FIG. 8 shows the X-ray photoelectron spectroscopy (XPS) profile of zinc oxide nanoparticles (Example 1: MFD-2 ZnO) prepared by a synthesis method using a microfluidic device according to the present application, aggregates thereof, and zinc oxide nanoparticles (Comparative Example 1: Exp. 10 ZnO) prepared by a large-scale synthesis method using a single vessel.

According to FIG. 8, when zinc oxide nanoparticles (Example 1: MFD-2 ZnO) prepared by a synthesis method using a microfluidic device according to the present application were compared with the aggregates and zinc oxide nanoparticles (Comparative Example 1: Exp. 10 ZnO) prepared by large-scale synthesis method in a single vessel on an X-ray photoelectron spectroscopy profile, there was a difference in strength depending on the particle size, but binding energy peaks of Zn2p and O1s could be confirmed.

2-7) Raman Spectroscopy

Zinc oxide nanoparticles and the aggregates were placed on a glass slide and confirmed by Raman spectroscopy (Horiba LabRam HR Evolution, Horiba, Ltd., UK) using a laser of 532 nm. Raman spectra were recorded with 5 acquisitions and 3 accumulations.

Figure 9:
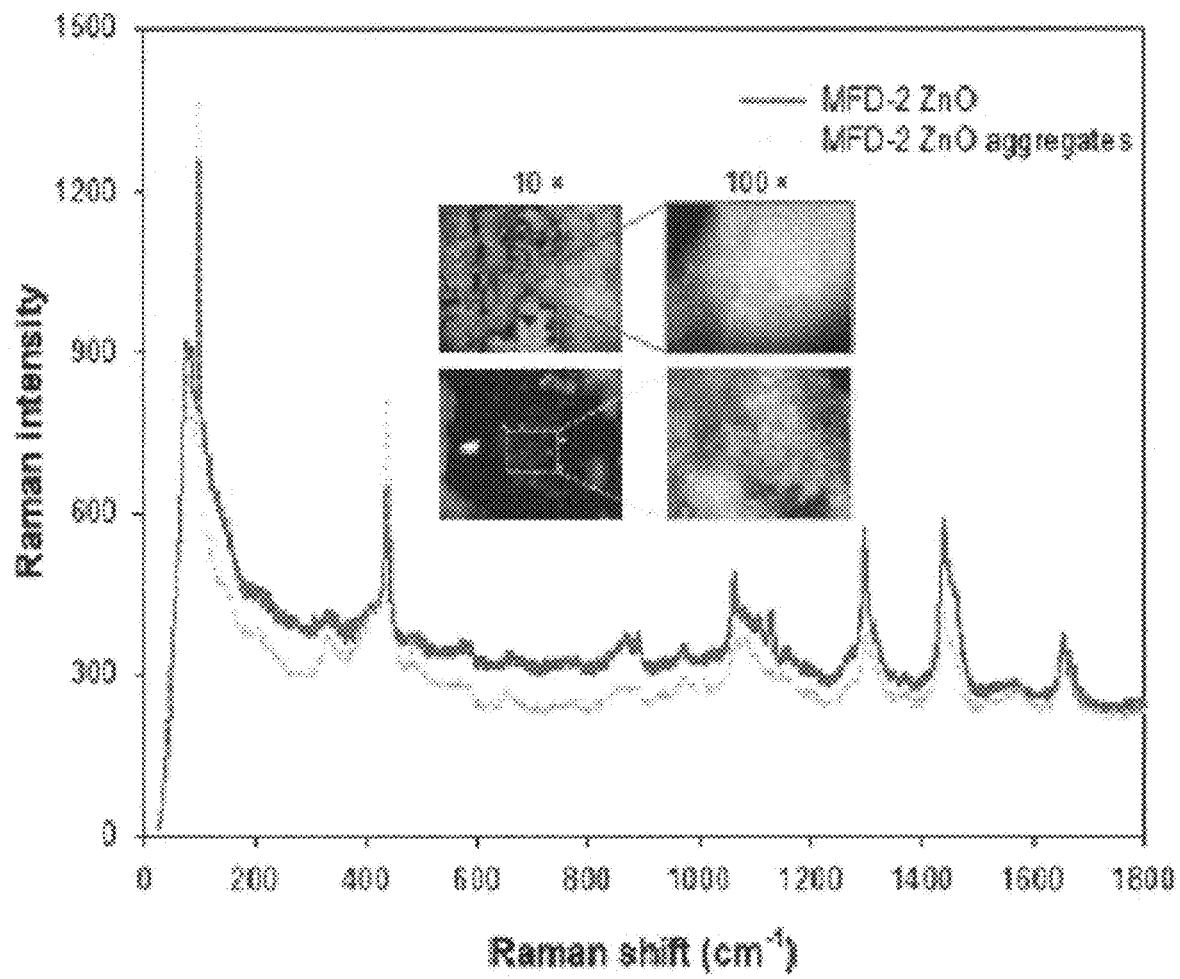
FIG. 9 shows Raman spectra of zinc oxide nanoparticles (Example 1: MFD-2 ZnO) prepared by a synthesis method using a microfluidic device according to the present application and aggregates thereof.

FIG. 9 shows Raman spectra of zinc oxide nanoparticles (Example 1: MFD-2 ZnO) prepared by a synthesis method using a microfluidic device according to the present application and aggregates thereof. The peaks can be interpreted as $E_2^{Low}$, $A_1^{Additional}$, $A_1^{TO}$, $E_2^{High}$, $A_1^{LO}$, $E_1^{LO}$, $A_1^{LO}+E_2^{High}$, $A_1^{2LO}+E_1^{2LO}$, $A_1^{TO}+A_1^{LO}+E_1^{High}+E_2^{High}$. In addition, the images in the graph display the zinc oxide nanoparticles and aggregates thereof at 10 or 100× magnification used to analyze the Raman spectrum.

2-8) Ultraviolet (UV)-Visible (Vis) Spectrophotometry

Light absorbance level of zinc oxide nanoparticles was confirmed by ultraviolet (UV)-visible (Vis) spectroscopy (DU730, Beckman Coulter, Inc., Brea, Calif., USA). A suspension of zinc oxide nanoparticles in hexane and the aggregates of zinc oxide nanoparticles (0.5 mg/mL and 1.0 mg/mL, total of 1 mL) were used as samples. Hexane was used as a blank solution, and the ultraviolet (UV)-visible (Vis) absorbance was recorded at a range of 190 nm~800 nm.

Figure 10:
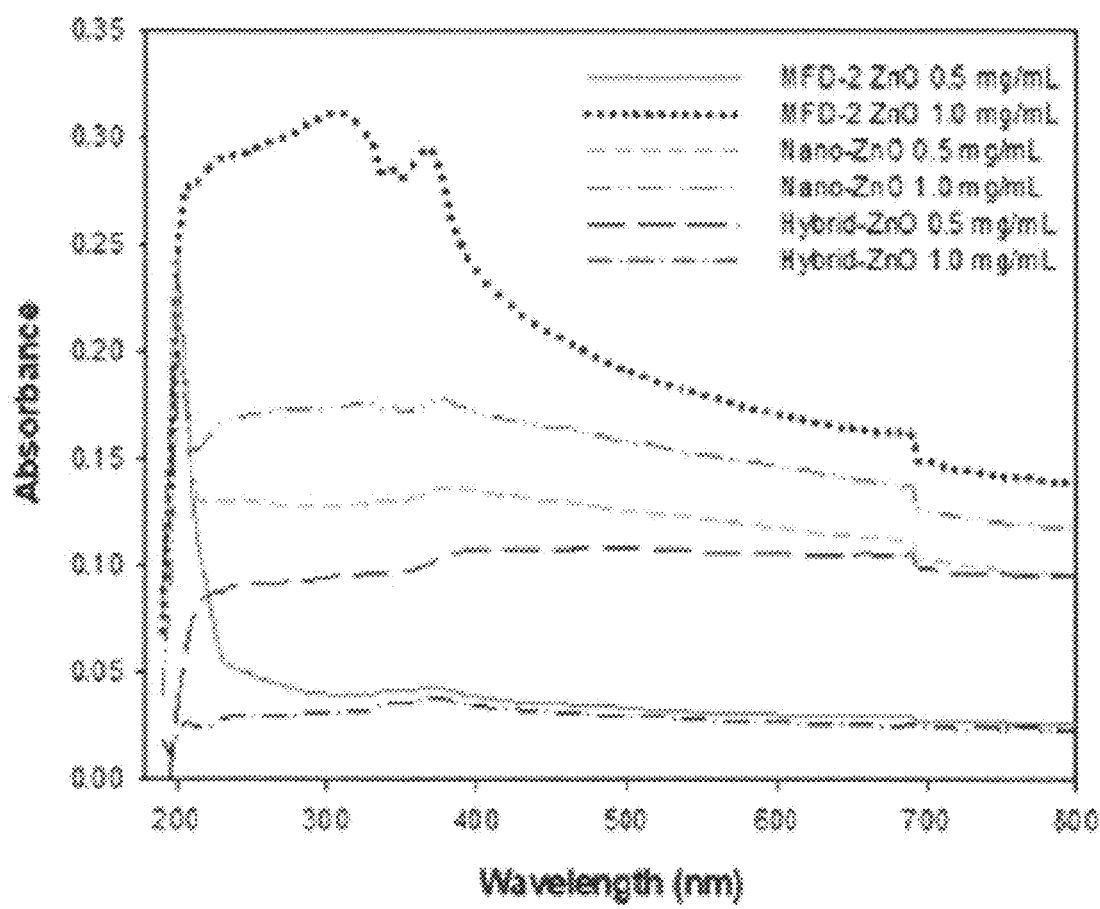
FIG. 10 shows ultraviolet (UV)-visible absorbance levels of zinc oxide nanoparticles (Example 1: MFD-2 ZnO) prepared by a synthesis method using a microfluidic device according to the present application and conventional zinc oxide nanoparticles (Comparative Example 2: nano-ZnO; Comparative Example 3: hybrid-ZnO) of Comparative Examples 2 and 3.

FIG. 10 shows zinc oxide nanoparticles (Example 1: MFD-2 ZnO) prepared by a synthesis method using a microfluidic device according to the present application and the conventional particles including zinc oxide nanoparticles (nano-ZnO) of Comparative Example 2 and the nano-to-micro-sized zinc oxide particles (hybrid-ZnO) of Comparative Example 3.

According to FIG. 10, when the concentration of the hexane dispersion of zinc oxide nanoparticles (Example 1: MFD-2 ZnO) prepared by the synthesis method using the microfluidic device according to the present application increased two-fold from 0.5 mg/mL to 1.0 mg/mL during ultraviolet (UV)-visible (Vis) spectrophotometry, the wavelength range showing the maximum absorbance peak also increased, and it can be seen that, at 1.0 mg/mL, maximum absorbance exhibited at 190 nm to 400 nm. In particular, the result of Example 1 (MFD-2 ZnO) provided a significantly higher absorbance level compared to Comparative Examples 2 (nano-ZnO) and Comparative Example 3 (hybrid-ZnO) at the same concentration.

In addition, according to the results of FIG. 10, in ultraviolet (UV)-visible (vis) spectrophotometry, from the aspect of the increase in absorbance according to the increase in the concentration of the zinc oxide nanoparticles (MFD-2 ZnO) of Example 1 or the increase in the wavelength range showing the absorbance peak, it can be seen that the quality with respect to the structure-forming ability as zinc oxide nanoparticles was significantly superior to those of Comparative Example 2 (nano-ZnO) and Comparative Example 3 (hybrid-ZnO). However, in Comparative Examples, it can be seen that the absorbance decreased despite a concentration increase due to precipitation of particles according to a variety of particle sizes. This absorbance analysis was confirmed to have a significant effect on the antibacterial properties of nanoparticles.

2-9) Adsorption and Photocatalytic Reaction Analysis

For adsorption, 0.01-1.0 mg/mL of zinc oxide nanoparticles were suspended in 0.01 mg/mL of a methyl orange aqueous solution. After standing in a dark place for 60 minutes, the sample was measured at 464 nm with a Synergy H1 hybrid multi-mode reader (BioTek Instruments, Inc., Winooski, Vt., USA). On the other hand, after the adsorption equilibrium, the sample was irradiated with ultraviolet (UV) light (40 W/m$^2$) with an ultraviolet (UV) lamp (ECOSET Co., Ltd., Ansan, Korea) connected to an electronic controller, and UV spectra were collected using a spectrometer (Jaz System, Ocean Optics, Inc., Petaluma, Calif.), USA) with Spectra Suite (Ocean Optics, Inc.) software. UV irradiation samples were analyzed at 464 nm. In addition, for comparison with zinc oxide nanoparticles, the aggregates of zinc oxide nanoparticles at 1.0 mg were suspended in an aqueous solution of methyl orange at 0.01 mg/mL, left in a dark place for 30 minutes, irradiated with the same ultraviolet (UV) lamp (ECOSET Co., Ltd.), and samples were collected at 10, 30 and 60 minutes. Then, the absorbance spectra of the samples at 464 nm were monitored using a Synergy H1 hybrid multi-mode reader (BioTek Instruments, Inc.). The wavelength at 600 nm was used as the reference.

FIGS. 11a-d show the analysis results for the dye adsorption and ultraviolet (UV) catalytic reaction of zinc oxide nanoparticles (Example 1: MFD-2 ZnO) prepared by a synthesis method using a microfluidic device according to the present application and aggregates thereof, and zinc oxide nanoparticles (Comparative Example 1: Exp. 10 ZnO) prepared by a large-scale synthesis method using a single vessel.

Figure 11:
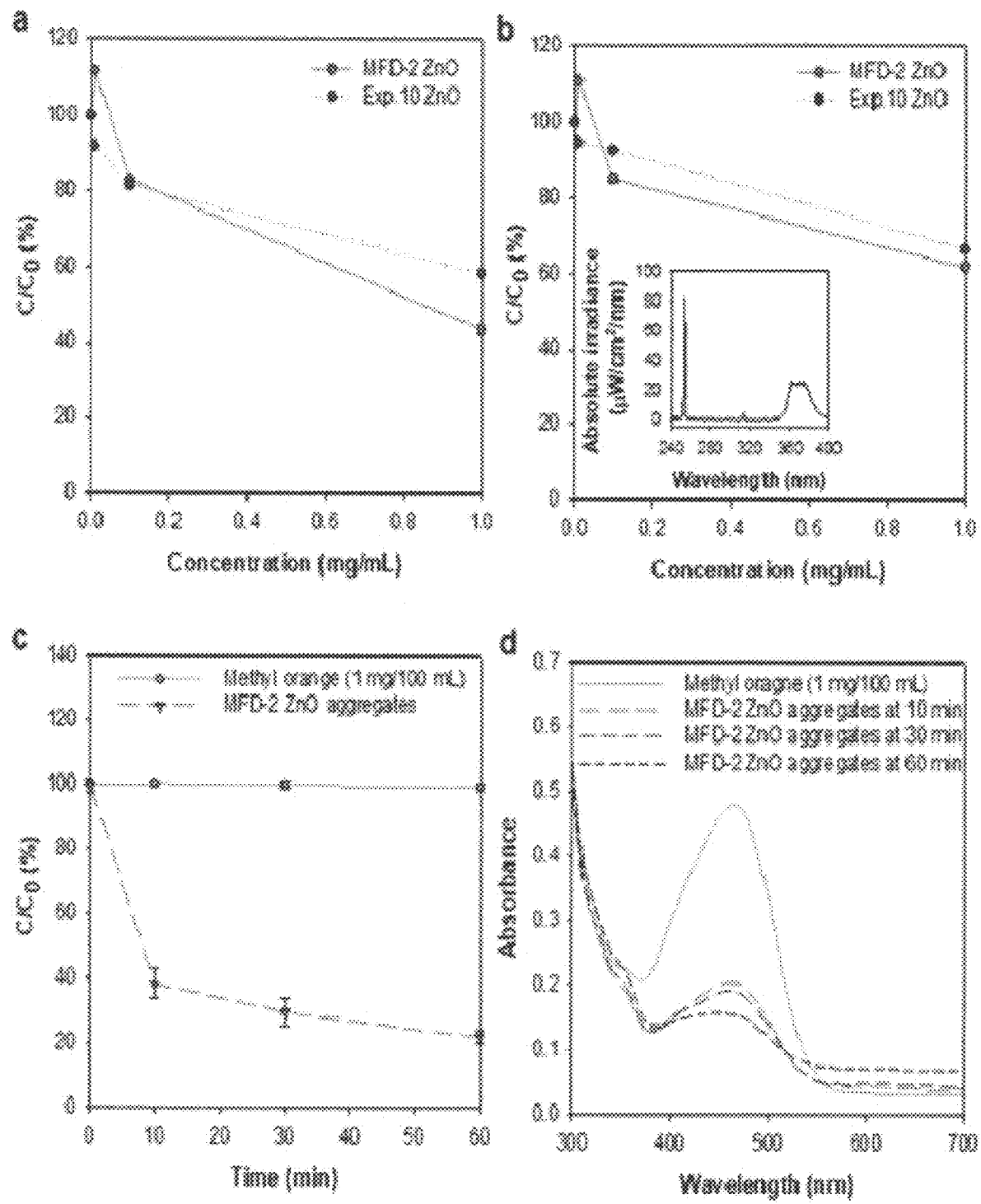
FIG. 11 shows the analysis results for the dye adsorption and photocatalytic reaction of zinc oxide nanoparticles (Example 1: MFD-2 ZnO) prepared by a synthesis method using a microfluidic device according to the present application and aggregates thereof, and zinc oxide nanoparticles (Comparative Example 1: Exp. 10 ZnO) prepared by a large-scale synthesis method using a single vessel.

FIG. 11a shows the results for the dye adsorption of zinc oxide nanoparticles (Example 1: MFD-2 ZnO) prepared by a synthesis method using a microfluidic device according to the present application, and zinc oxide nanoparticles (Comparative Example 1: Exp. 10 ZnO) prepared by a large-scale synthesis method using a single vessel. FIG. 11b shows the spectral results of the ultraviolet (UV) lamp and the removal of the dye by the ultraviolet (UV) catalytic reaction of the zinc oxide nanoparticles of Example 1 (MFD-2 ZnO) and Comparative Example 1 (Exp. 10 ZnO). In addition, FIG. 11c shows the change in the pigment concentration for 60 minutes when the ultraviolet (UV) catalytic reaction was performed after adsorbing onto the aggregates of zinc oxide nanoparticles (Example 1: MFD-2 ZnO), and FIG. 11d shows the ultraviolet (UV)-visible (Vis) scan results offering the dye absorbance at 300 nm~700 nm after 10-min, 30-min and 60-min incubations described by ultraviolet (UV) catalysis following the adsorption of the dye onto the aggregates of zinc oxide nanoparticles (Example 1: MFD-2 ZnO).

According to FIGS. 11a-11d, zinc oxide nanoparticles (Example 1: MFD-2 ZnO, 0.01-1.0 mg/mL) prepared by a synthesis method using a microfluidic device according to the present application and the aggregates thereof can have a high adsorption property for the dye, methyl orange 0.01 mg/mL, and the photocatalytic reaction upon ultraviolet (UV) irradiation for 10, 30 and 60 minutes reduced the methyl orange concentration from 38% to 22%.

2-10) Fluorescence Measurement

The fluorescence of zinc oxide nanoparticles was determined at room temperature with a Synergy H1 hybrid multi-mode reader (BioTek Instruments, Inc.) and recorded with Gen 5 software (BioTek Instruments, Inc.). The excitation wavelength was 358 nm and the emission wavelength was in the range of 400 nm to 700 nm. Zinc oxide nanoparticles were suspended in hexane, and hexane was used as a blank.

Figure 12:
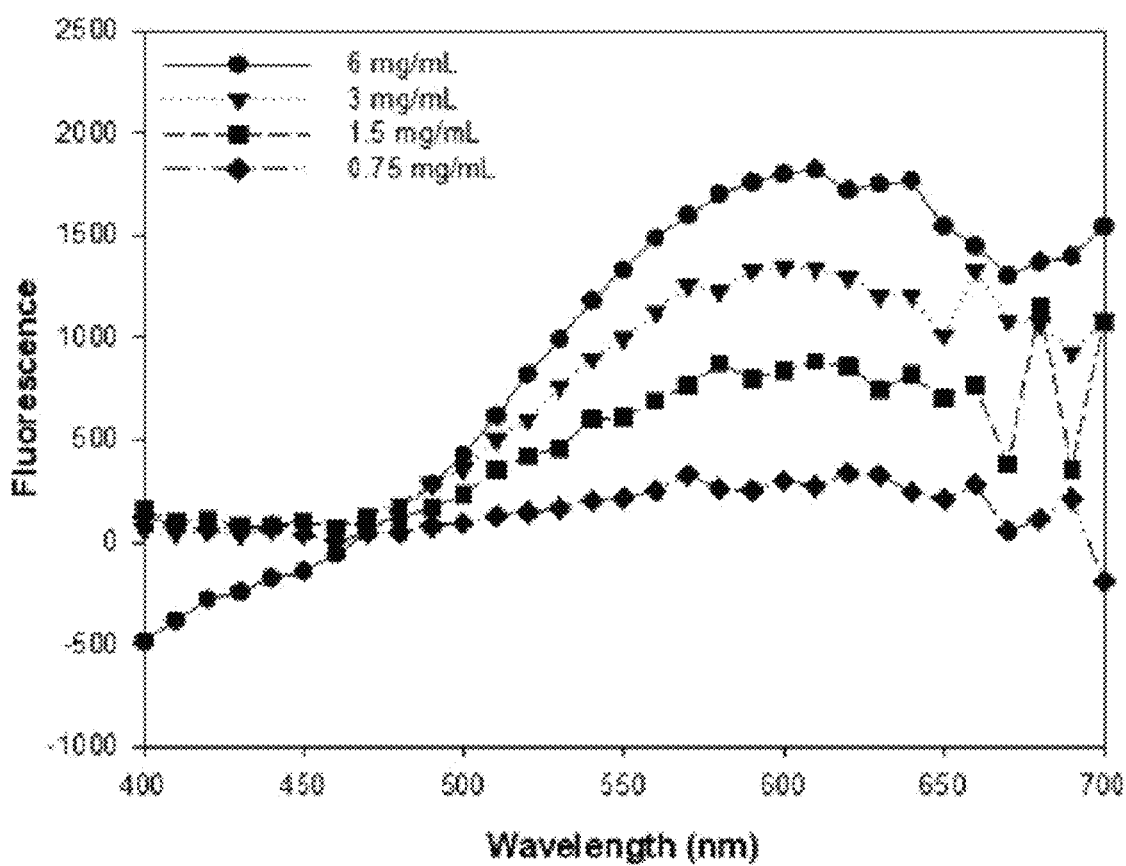
FIG. 12 shows the measurement results of fluorescence ($\lambda_{excitation}$, 358 nm; $\lambda_{emission}$, 400 nm-700 nm) using 0.75 mg/mL to 6 mg/mL of zinc oxide nanoparticles (Example 1: MFD-2 ZnO) prepared by a synthesis method using a microfluidic device according to the present application.

FIG. 12 shows the analysis results of fluorescence ($\lambda_{excitation}$, 358 nm; $\lambda_{emission}$, 400 nm 700 nm) using 0.75 mg/mL to 6 mg/mL of zinc oxide nanoparticles (Example 1: MFD-2 ZnO) prepared by a synthesis method using a microfluidic device according to the present application.

According to FIG. 12, zinc oxide nanoparticles (Example 1: MFD-2 ZnO) prepared by a synthesis method using a microfluidic device according to the present application exhibited fluorescence at an excitation wavelength of 358 nm and an emission wavelength of 400 nm~700 nm, therefore it has been confirmed that they can be used as an imaging factor.

2-11) Brunauer-Emmett-Teller (BET) Analysis

The specific surface area and mesopore/micropore analyses of zinc oxide nanoparticles were monitored from nitrogen adsorption-desorption isotherms of Tristar and ASAP 2020 Plus Physisorption (Micromeritics Instrument Corp., Norcross, Ga., USA). Experimental specific surface area, pore volume and average pore diameter were calculated with Microactive software (V6.05A, Micromeritics Instrument Corp.) based on Brunauer-Emmett-Teller (BET) theory.

Figure 13A:
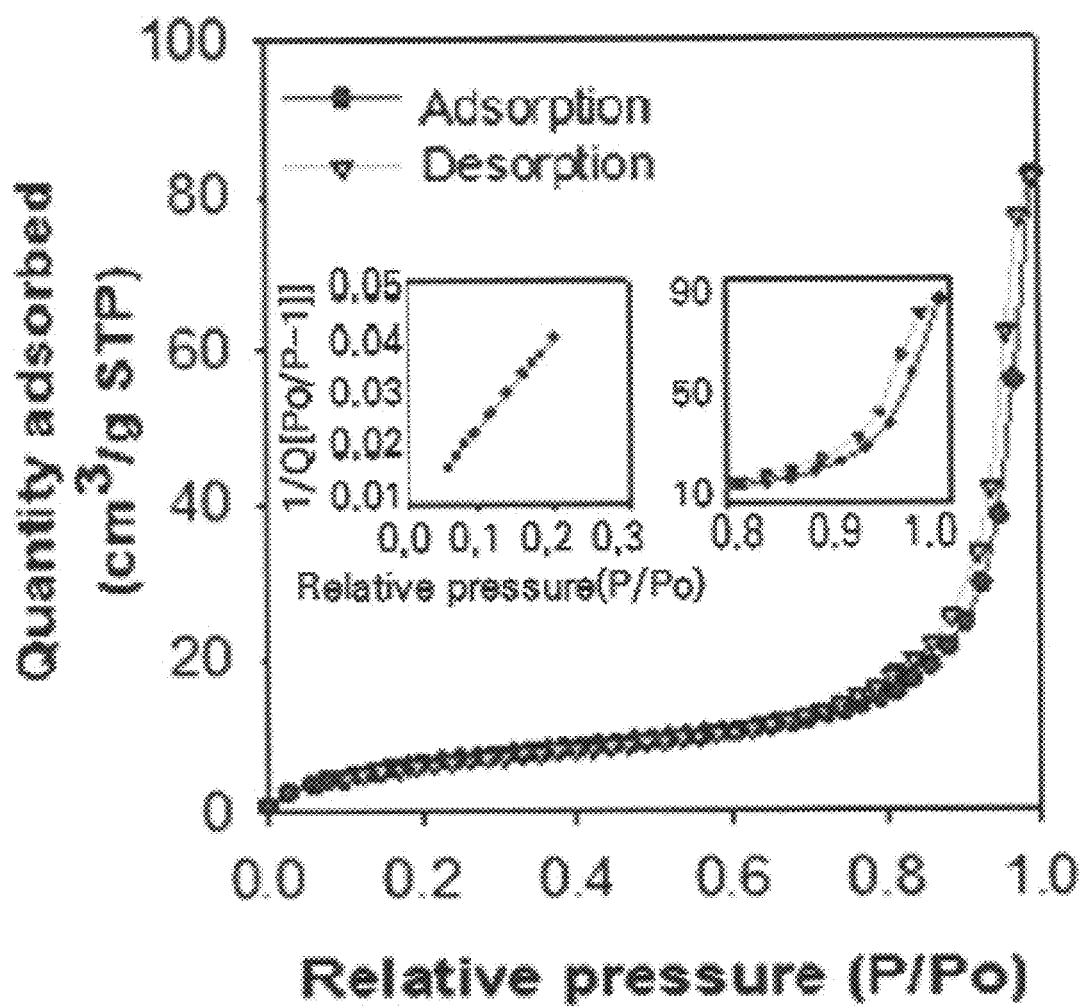
FIGS. 13A-13D show adsorption-desorption isotherms for mesopore analysis of zinc oxide nanoparticles (Example 1: MFD-2 ZnO) prepared by a synthesis method using a microfluidic device according to the present application and zinc oxide nanoparticles (Comparative Example 1: Exp. 10 ZnO; Comparative Example 2: nano-ZnO; Comparative Example 3: hybrid-ZnO) of Comparative Examples 1 to 3.
Figure 13B:
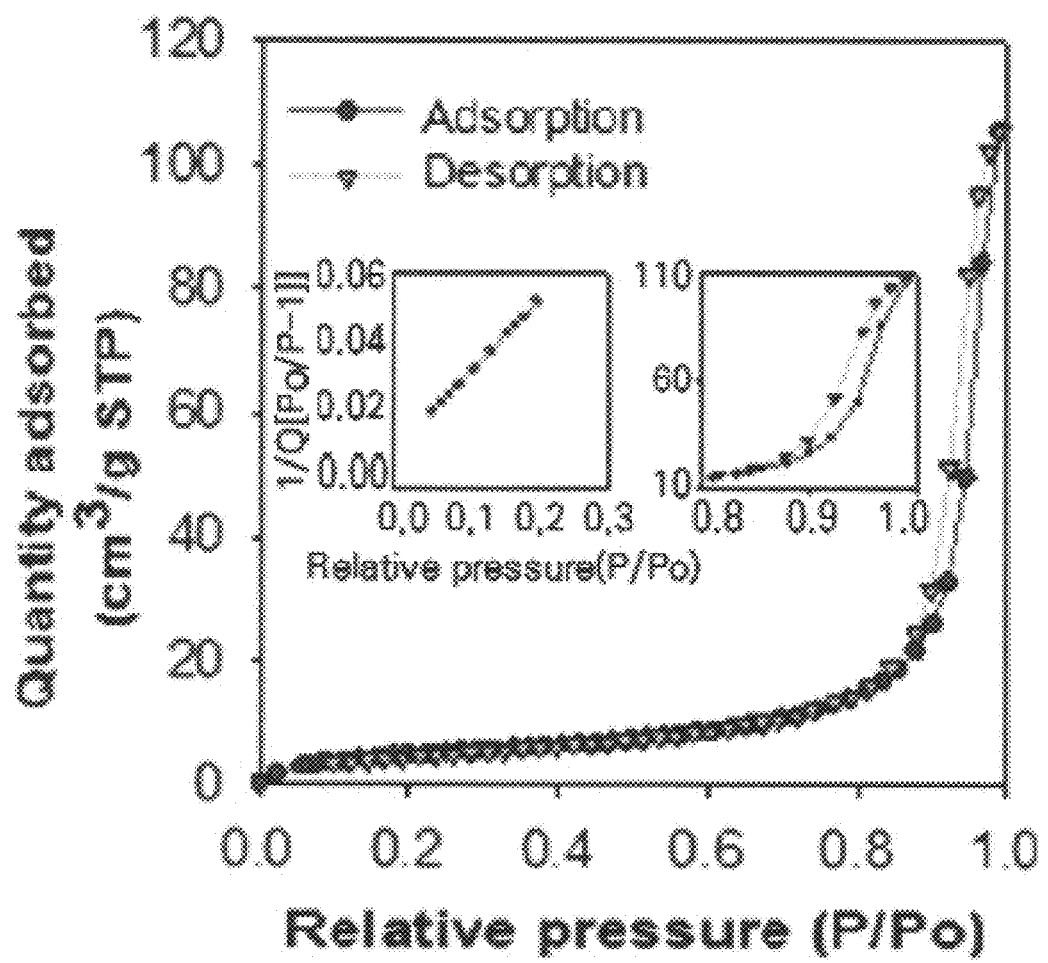
Figure 13C:
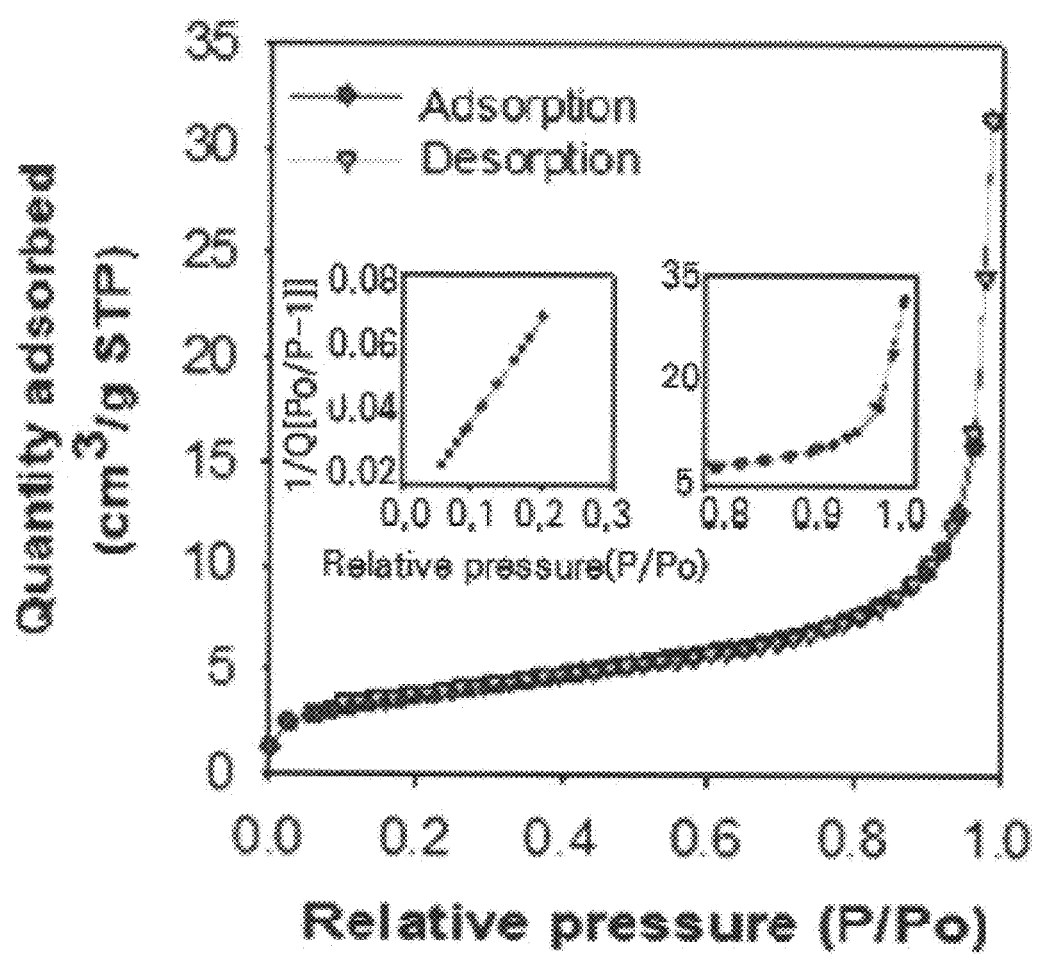
Figure 13D:
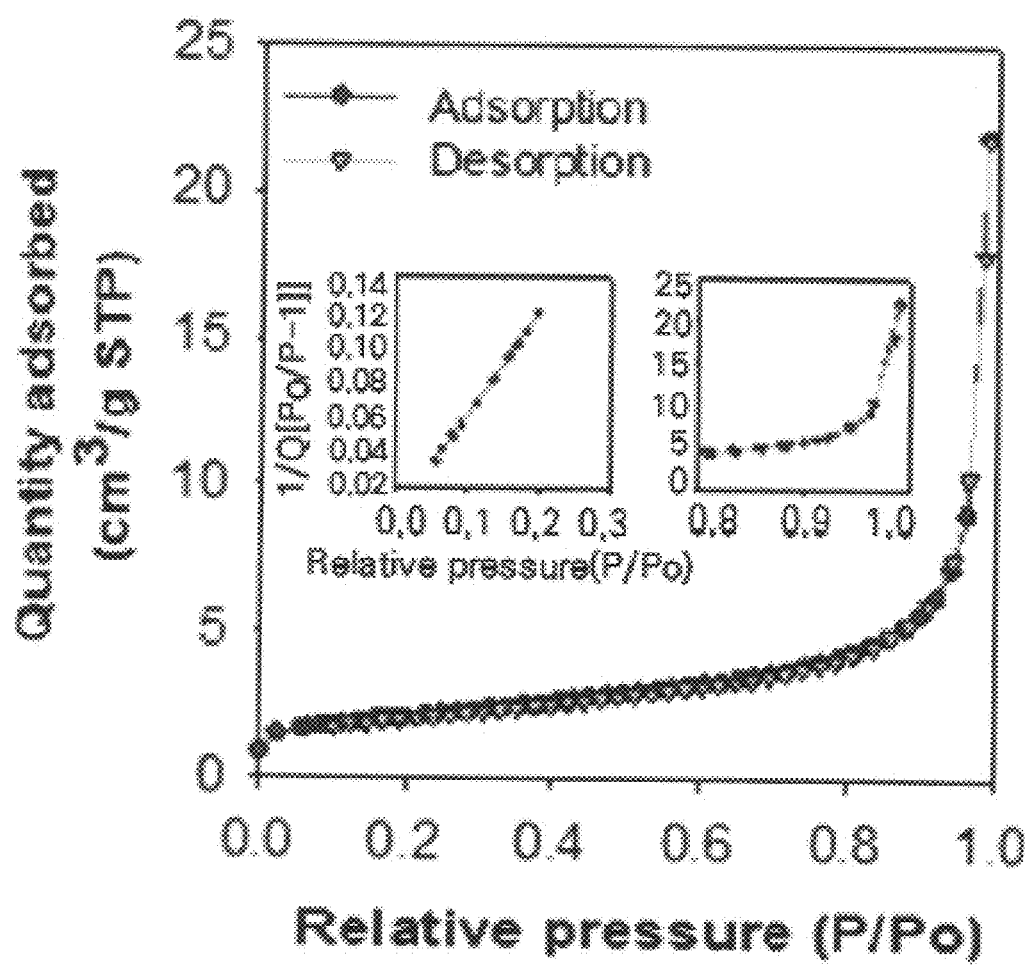

FIGS. 13A-13D show adsorption-desorption isotherms for mesopore analysis, FIG. 13A shows the result of zinc oxide nanoparticles (Example 1: MFD-2 ZnO) prepared by a synthesis method using a microfluidic device, FIG. 13B shows the result of zinc oxide nanoparticles (Comparative Example 1: Exp. 10 ZnO) prepared by large-scale synthesis method using a single vessel, and FIGS. 13C and 13D show the results of zinc oxide nanoparticles (nano-ZnO) of Comparative Example 2 and zinc oxide particles (hybrid-ZnO) of Comparative Example 3, respectively.

According to FIGS. 13A-13D, zinc oxide nanoparticles (Example 1: MFD-2 ZnO) prepared by a synthesis method using a microfluidic device according to the present application exhibited mesopores during Brunauer-Emmett-Teller (BET) analysis. In addition, zinc oxide nanoparticles (Exp. 10 ZnO) prepared by the large-scale synthesis method using a single vessel of Comparative Example 1, zinc oxide nanoparticles (nano-ZnO) of Comparative Example 2, and nano-to-micro-sized zinc oxide particles (hybrid-ZnO) of Comparative Example 3 exhibited mesopores. In particular, in the case of zinc oxide nanoparticles (Example 1: MFD-2 ZnO) prepared by a synthesis method using a microfluidic device according to the present application, a large surface area was exhibited.

The following Table 1 lists the results of mesopore analysis of zinc oxide (nano) particles with reference to FIGS. 13A-13D, and shows the experimental results for the pore size, pore volume, surface area, and pore size:particle size ratio.

TABLE 1

| zinc oxide particles | pore size (nm) | pore volume ($cm^3/g$) | surface area ($m^2/g$) | pore size:particle size ratio |
|---|---|---|---|---|
| MFD-2 ZnD | 19.48 | 0.127 | 26.1 ± 0.14 | 0.32 |
| Exp. 10 ZnO | 33.43 | 0.163 | 19.5 ± 0.06 | 0.31 |
| Nano-ZnO | 14.33 | 0.0487 | 13.6 ± 0.02 | 0.14 |
| Hybrid-ZnO | 18.26 | 0.0339 | 7.4 ± 0.01 | 0.16 |

Figure 14:
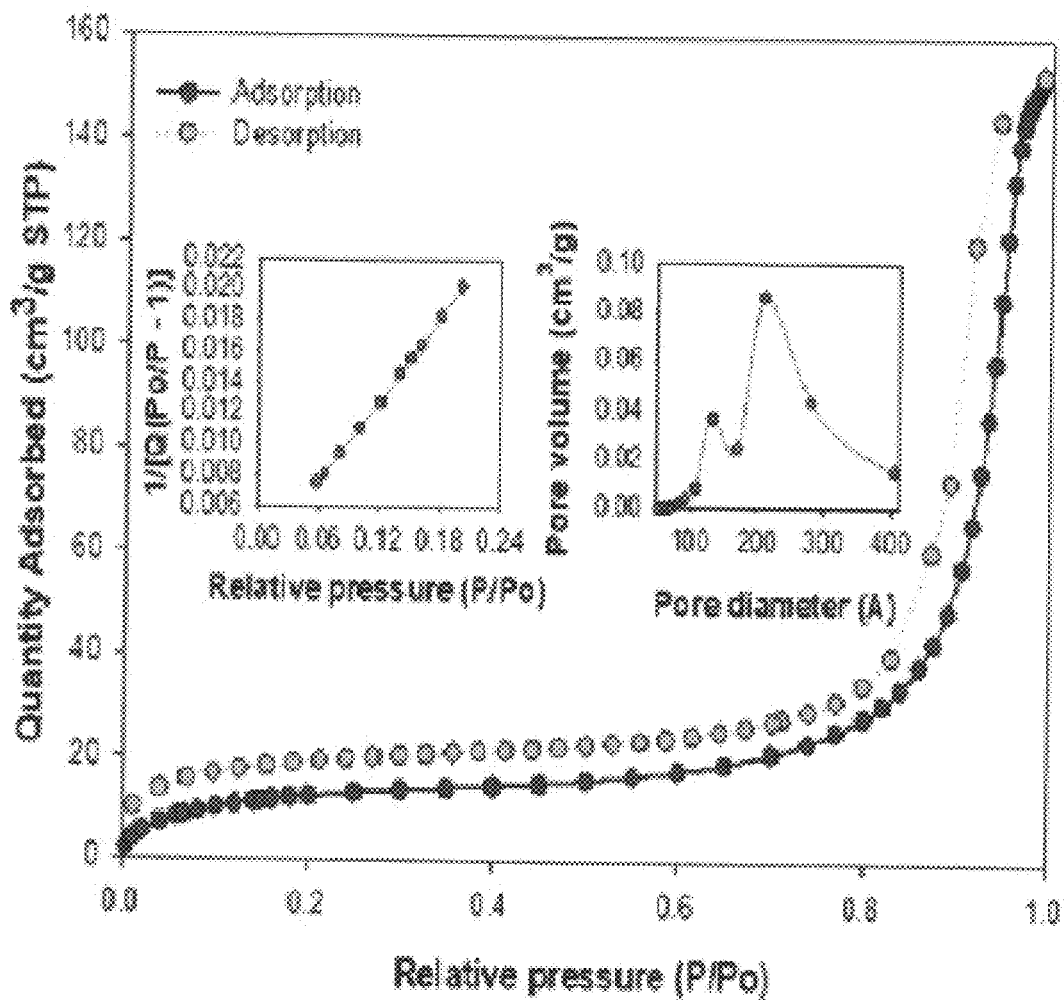
FIG. 14 shows adsorption-desorption isotherms for micropore analysis of zinc oxide nanoparticles (Example 1: MFD-2 ZnO) prepared by a synthesis method using a microfluidic device according to the present application.

FIG. 14 also shows the adsorption-desorption isotherm of zinc oxide nanoparticles (Example 1: MFD-2 ZnO) for micropore analysis, which were prepared by a synthesis method using a microfluidic device according to the present application, and from FIG. 14, micropores of 2 nm or less in the zinc oxide nanoparticle (MFD-2 ZnO) of Example 1 were identified.

The following Table 2 lists the results of micropore analysis of the zinc oxide nanoparticles (MFD-2 ZnO) of Example 1 with reference to FIG. 14, and shows the experimental results for pore size, pore volume and surface area.

TABLE 2

| zinc oxide particles | pore size (nm) | pore volume ($cm^3/g$) | surface area ($m^2/g$) | pore size:particle size ratio |
|---|---|---|---|---|
| Micropore analysis (17.12Å~19.20Å) | | | | |
| MFD-2 ZnD | 17.9197 | 0.1504 | 83.9072 | — |

2-12) Atomic Force Microscopy (AFM)

The surface topology of zinc oxide nanoparticles on a silicon wafer was examined by atomic force microscopy (AFM, Nanoscopes Multimode IVa, Bruker, Billerica, Mass., USA). Atomic force microscope (AFM) images in 10 μm×10 μm area were observed using a tapping mode and analyzed using NanoScope software (5.31r1, Veeco Instruments, Inc., Plainview, N.Y., USA).

Figure 15:
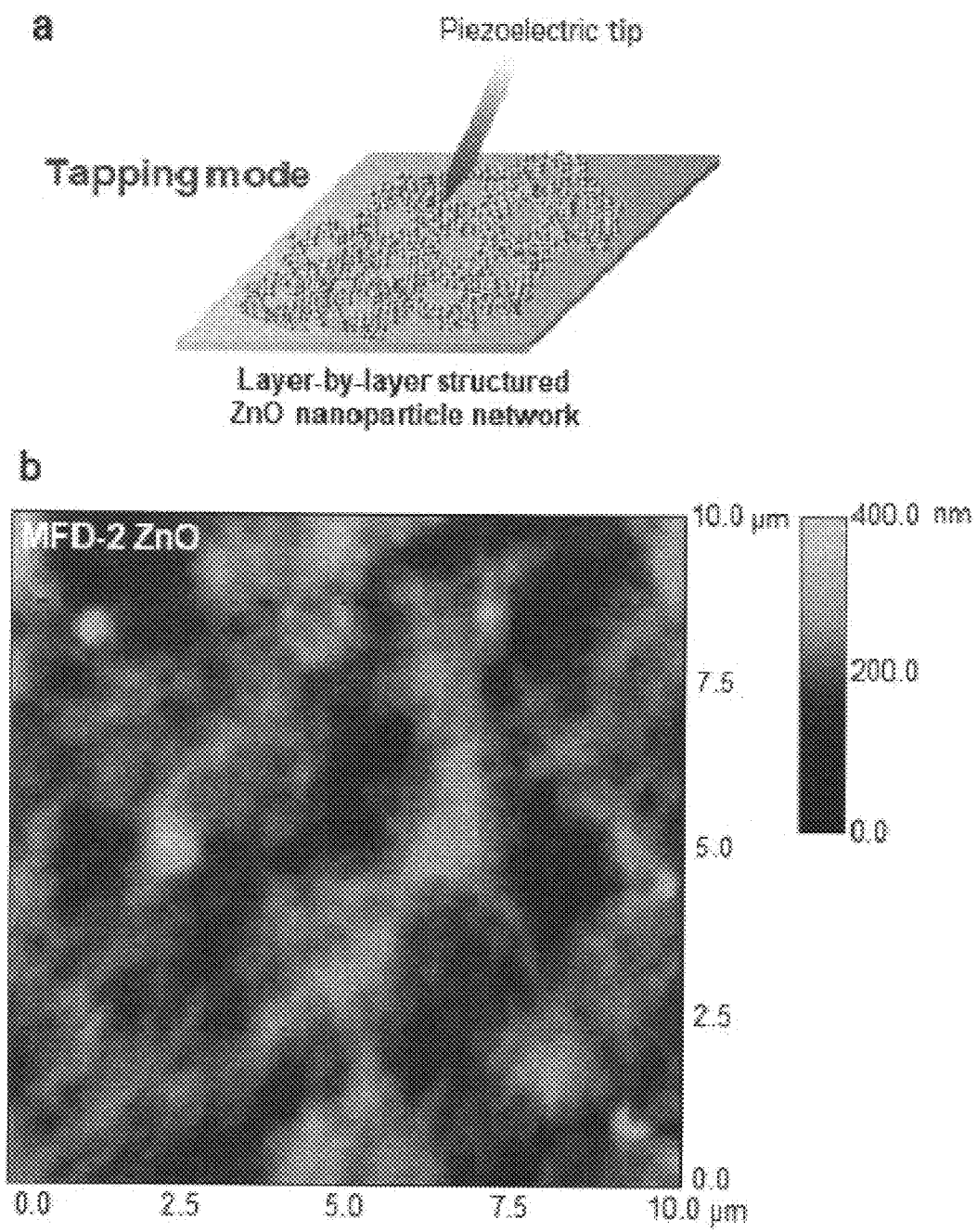
FIG. 15 shows an atomic force microscope (AFM) image of zinc oxide nanoparticles (Example 1: MFD-2 ZnO) prepared by a synthesis method using a microfluidic device according to the present application, observed after immobilization on a silicon wafer using a tapping mode with a piezoelectric tip.

FIG. 15 shows the atomic force microscope (AFM) analysis result observed after immobilizing, on a silicon wafer, zinc oxide nanoparticles (Example 1: MFD-2 ZnO) prepared by a synthesis method using a microfluidic device according to the present application, FIG. 15a shows a schematic diagram of scanning the three-dimensional hierarchical porous structure of zinc oxide nanoparticles (Example 1: MFD-2 ZnO) with a piezoelectric tip in a tapping mode, and FIG. 15b shows the atomic force microscope (AFM) results of analyzing the porous hierarchical network structure of zinc oxide nanoparticles (Example 1: MFD-2 ZnO) after immobilization on silicon wafer.

That is, according to FIG. 15a, it can be seen that macropores having diameter of 50 nm more are generated by aggregation and coalescence of zinc oxide nanoparticles (Example 1: MFD-2 ZnO), which forms a three-dimensional network structure, for example, a honeycomb. Here, the three-dimensional network structure has a significant advantage in terms of energy exchange. Meanwhile, according to FIG. 15b, a dark brown color represents a silicon wafer with macropores formed by evaporation of hexane, and a bright yellow color represents a three-dimensional structure of zinc oxide nanoparticles (Example 1: MFD-2 ZnO).

Figure 16:
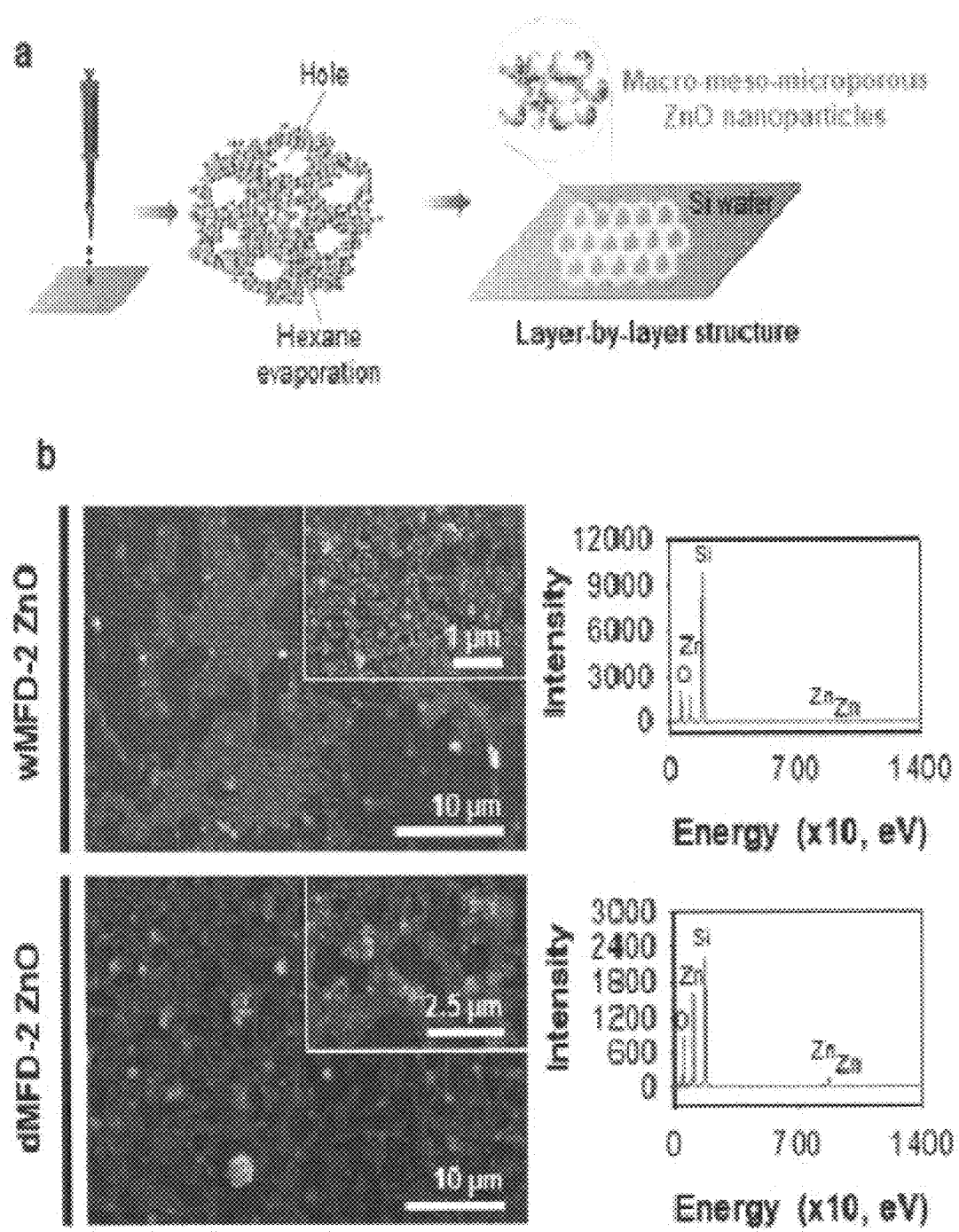
FIG. 16 displays a schematic diagram and field emission scanning electron microscope (FE-SEM) images with energy dispersive X-ray spectroscopy (EDS) profiles of dried (dMFD-2 ZnO) and wetted (wMFD-2 ZnO) zinc oxide nanoparticles (Example 1: MFD-2 ZnO) for confirming the formation of micropores, mesopores and macropores of three-dimensional architecture on silicon wafer after the immobilization, which were prepared by a synthesis method using a microfluidic device according to the present application.

Meanwhile, FIG. 16 provides a schematic diagram and field emission scanning electron microscope (FE-SEM) images with energy dispersive X-ray spectroscopy (EDS) profiles for confirming the hierarchical porous structure from generating micropores, mesopores and macropores according to the wet method and the dry method when drying at room temperature to immobilize, on a silicon wafer, zinc oxide nanoparticles (Example 1: MFD-2 ZnO) prepared by the synthesis method using a microfluidic device according to the present application.

That is, FIG. 16a displays a schematic diagram for the generation of a hierarchical network structure according to hexane evaporation after dropping a hexane dispersion of zinc oxide nanoparticles (Example 1: MFD-2 ZnO) on a silicon wafer, and FIG. 16b shows the results of field emission scanning electron microscope (FE-SEM) images and energy dispersive X-ray spectroscopy (EDS) profiles for zinc oxide nanoparticles (Example 1: MFD-2 ZnO) on a silicon wafer. Zinc oxide nanoparticles (wMFD-2 ZnO) in the form of ethanol paste were used for the wet method, and zinc oxide nanoparticles (dMFD-2 ZnO) in the form of dry powder were used for the dry method.

FIG. 16a illustrates mesopores and macropores in a self-assembled three-dimensional hierarchical network structure created by hexane evaporation after dropping hexane suspensions of zinc oxide nanoparticles (Example 1: MFD-2 ZnO) having micropores, on a silicon wafer.

According to FIG. 16b, the zinc oxide nanoparticles (Example 1: MFD-2 ZnO) prepared by the synthesis method using the microfluidic device according to the present application can generate a three-dimensional porous network structure, along with binding energy peaks of oxygen (O) at 530 eV and zinc (Zn) at 1,030 eV, 8,640 eV, and 9,570 eV in the energy dispersive X-ray spectroscopy (EDS) profiles, when the zinc oxide nanoparticles are suspended in an organic solvent and dropped onto a silicon wafer, by employing a wet method using zinc oxide nanoparticles (wMFD-2 ZnO) in the form of ethanol paste after the synthesis, or a dry method using zinc oxide nanoparticles (dMFD-2 ZnO) in the dried form after the synthesis.

Figure 17:
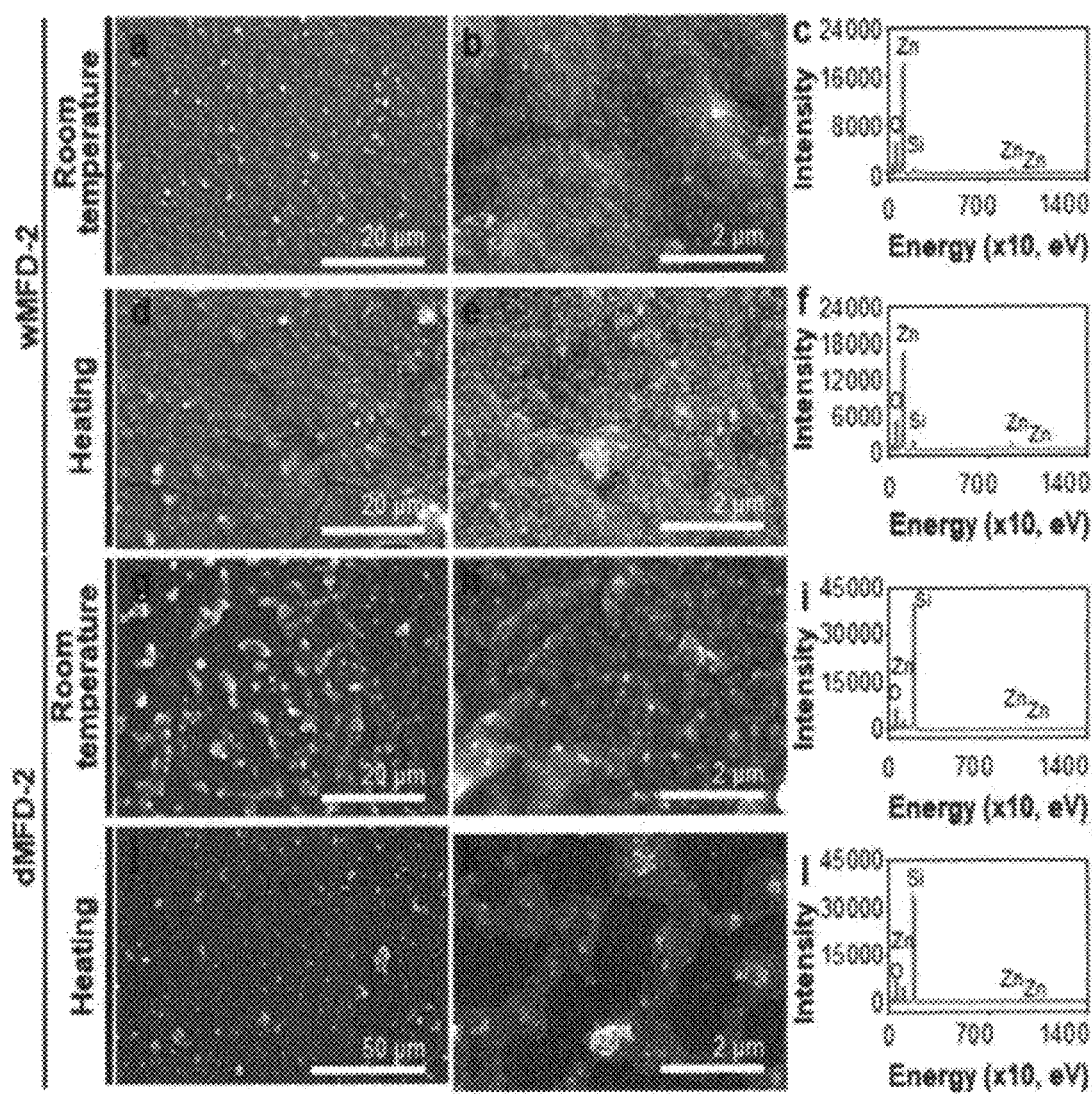
FIG. 17 shows the field emission scanning electron microscope (FE-SEM) and energy dispersive X-ray spectroscopy (EDS) results of manufactured samples of zinc oxide nanoparticles (Example 1: MFD-2 ZnO) prepared by a synthesis method using a microfluidic device according to the present application of a wet method/dry method immobilizing the samples on a silicon wafer with different drying methods.

Meanwhile, FIG. 17 shows the fixation on a silicon wafer according to a drying method of zinc oxide nanoparticles (Example 1: MFD-2 ZnO) prepared by a synthesis method using a microfluidic device according to the present application. FIGS. 17a, 17b, 17d, 17e, 17g, 17h, 17j, and 17k show field emission scanning electron microscope (FE-SEM) images, and FIGS. 17c, 17f, 17i and 17l show energy dispersive X-ray spectroscopy (EDS) profiles. With respect to a wet method and a dry method of the zinc oxide nanoparticles (MFD-2 ZnO) of Example 1, zinc oxide nanoparticles (wMFD-2 ZnO) in the form of ethanol paste were used for the wet method, and zinc oxide nanoparticles (dMFD-2 ZnO) in the form of dry powder were used for the dry method. As a drying method for enhancing the evaporation of the organic solvent during fixation, a room temperature drying method of being left at room temperature and a 50° C. heating method of heating to 50° C. were used.

According to FIG. 17, zinc oxide nanoparticles (Example 1: MFD-2 ZnO) prepared by a synthesis method using a microfluidic device were suspended in hexane, dropped on a silicon wafer, left at room temperature or dried by heating to 50° C. to fix it. In particular, referring to FIG. 17k of the field emission scanning electron microscope (FE-SEM) image, it can be found that zinc oxide nanoparticles (dMFD-2 ZnO) in a dry powder form using the dry method generate a three-dimensional self-assembled porous network structure that exhibits distinct mesopores and macropores on a silicon wafer after immobilization upon drying by a 50° C. heating method. In addition, in the energy dispersive X-ray spectroscopy (EDS) profiles, it can be seen that the binding energy peaks of oxygen (O) at 530 eV and zinc (Zn) at 1,030 eV, 8,640 eV, and 9,570 eV are exhibited.

Figure 18:
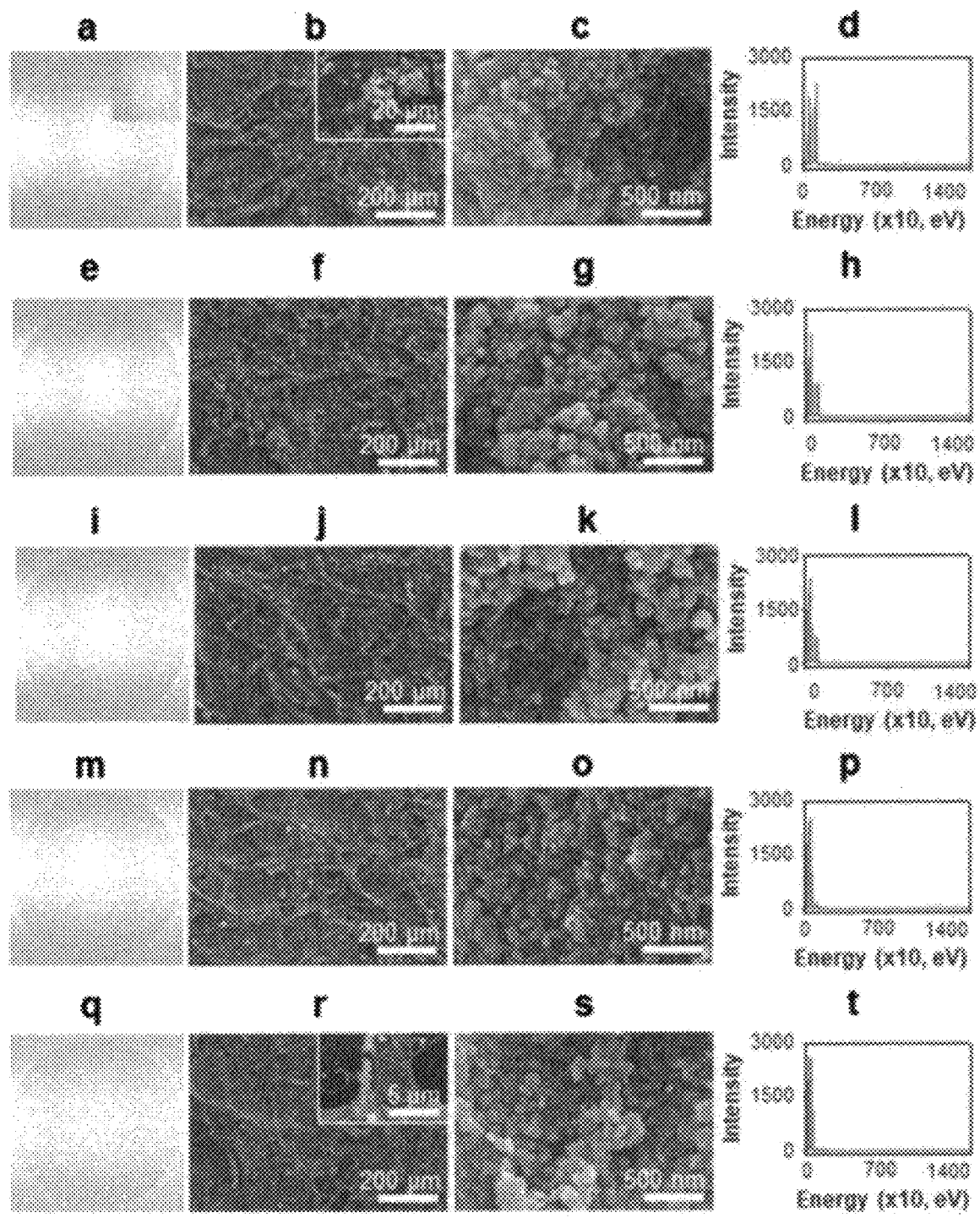
FIG. 18 shows photographs taken after immobilizing, on filter paper, zinc oxide nanoparticles (Example 1: MFD-2 ZnO) prepared by a synthesis method using a microfluidic device according to the present application by a dry method, and field emission scanning electron microscope (FE-SEM) images and diagrams showing energy dispersive X-ray spectroscopy (EDS) profiles.

FIG. 18 shows photographs taken after fixing, on filter paper, zinc oxide nanoparticles (Example 1: MFD-2 ZnO) prepared by the microfluidic synthesis according to the present application by zinc oxide nanoparticles (dMFD-2 ZnO) of the dry method, and field emission scanning electron microscope (FE-SEM) images and energy dispersive X-ray spectroscopy (EDS) profiles.

FIGS. 18a to 18d are 5.0 mg, FIGS. 18e to 18h are 25 mg, FIGS. 18i to 18l are 12.5 mg, FIGS. 18m to 18p are 6.25 mg, and FIG. 18q to 18t are 3.125 mg of zinc oxide nanoparticles (Example 1: MFD-2 ZnO), and zinc oxide nanoparticles (dMFD-2 ZnO) of the dry method were used. At this time, 1 mL of hexane was used as a reference.

FIG. 18 shows photographs and field emission scanning electron microscope (FE-SEM) images taken after 0.3125-5.0 mg of zinc oxide nanoparticles (dMFD-2 ZnO) of the dry method were dispersed in hexane, repeatedly dropped on filter paper and dried to fix zinc oxide nanoparticles (dMFD-2 ZnO) of the dry method.

According to FIGS. 18a to 18c, 18e to 18g, 18i to 18k, 18m to 18o, and 18q to 18s, the pore formation is not smooth and the three-dimensional structure formation is not good, but zinc oxide nanoparticles (dMFD-2 ZnO) of the dry method spread widely on the filter paper, and it showed a form of coating along the fiber structure of the filter paper. This property increases coatability and lowers porosity. In addition, in the energy dispersive X-ray spectroscopy (EDS) profiles, it can be seen that the peaks of oxygen (O) at 530 eV and zinc (Zn) at 1,030 eV, 8,640 eV, and 9,570 eV are exhibited.

Figure 19:
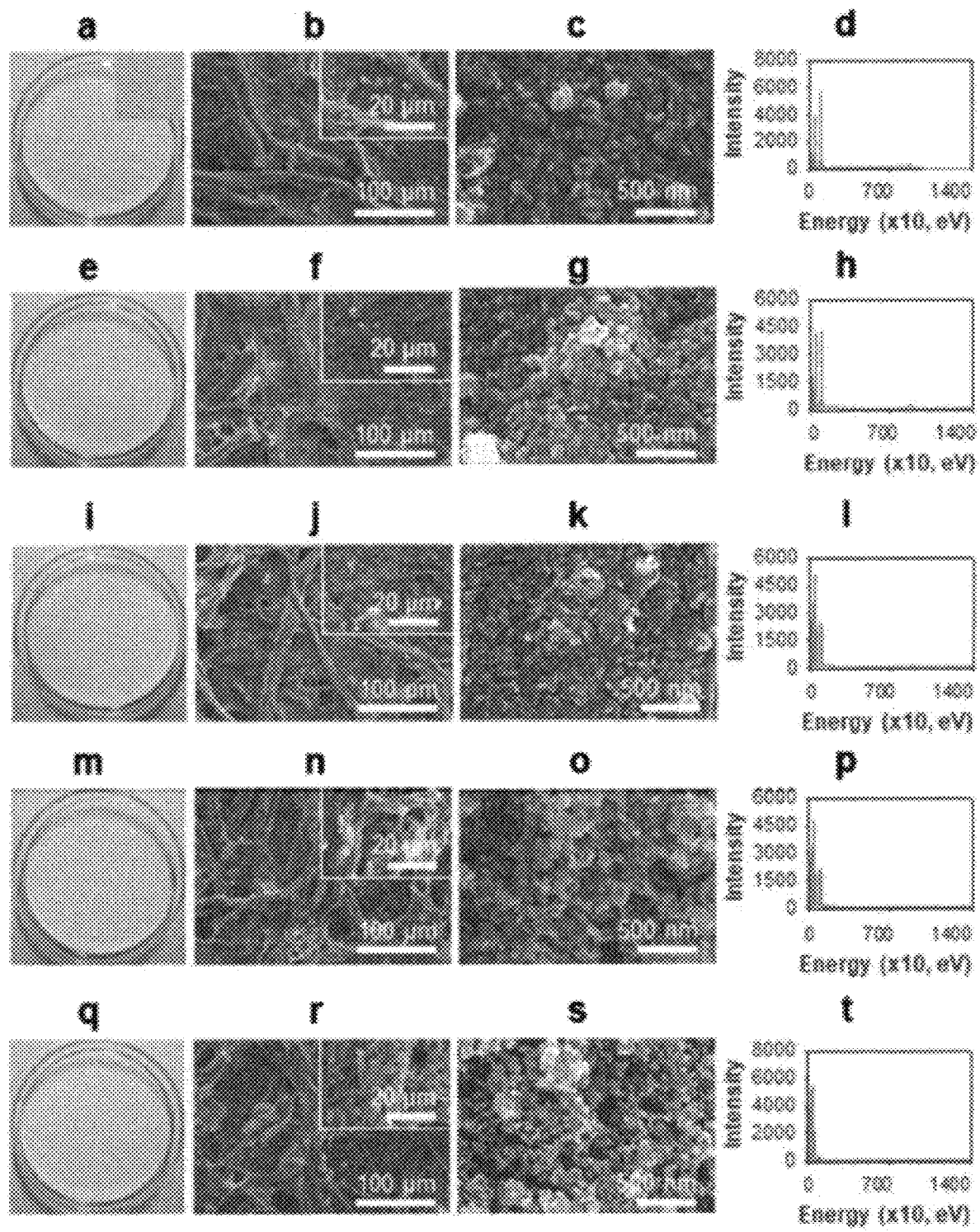
FIG. 19 shows photographs taken after immobilizing, on filter paper, zinc oxide nanoparticles (Example 1: MFD-2 ZnO) prepared by a synthesis method using a microfluidic device according to the present application by a wet method, and field emission scanning electron microscope (FE-SEM) images and diagrams showing energy dispersive X-ray spectroscopy (EDS) profiles.

FIG. 19 shows a photograph taken after fixing, on filter paper, zinc oxide nanoparticles (Example 1: MFD-2 ZnO) prepared by a synthesis method using a microfluidic device according to the present application by zinc oxide nanoparticles (wMFD-2 ZnO) of the wet method, and field emission scanning electron microscope FE-SEM) images and a diagram showing energy dispersive X-ray spectroscopy (EDS) profiles.

FIG. 19 shows photographs and field emission scanning electron microscope (FE-SEM) images taken after zinc oxide nanoparticles (dMFD-2 ZnO) of the wet method were dispersed in hexane, repeatedly dropped on filter paper and dried to fix zinc oxide nanoparticles (wMFD-2 ZnO) of the wet method.

FIG. 19 shows the content of nanoparticles based on 1 mL of hexane. FIGS. 19a to 19d are 5.0 mg, FIGS. 19e to 19h are 2.5 mg, FIGS. 19i to 19l are 1.25 mg, FIGS. 19m to 19p are 0.625 mg, and FIGS. 19q to 19t are 0.3125 mg of zinc oxide nanoparticles (Example 1: MFD-2 ZnO).

According to FIGS. 19a to 19c, FIGS. 19e to 19g, and FIGS. 19i to 19k, the pore formation was not smooth yet, and the three-dimensional structure formation was also not good, thereby reducing the porosity of the zinc oxide nanoparticles during the formation of the three-dimensional structure. However, it was confirmed that pores in the three-dimensional structure were formed in FIGS. 19m to 19o and FIGS. 19q to 19s. In addition, in the energy dispersive X-ray spectroscopy (EDS) profiles, it can be seen that the peaks of carbon (C) at 280 eV, oxygen (O) at 530 eV, zinc (Zn) at 1,030 eV, 8,640 eV, and 9,570 eV are exhibited.

Having thus described this application in detail, it should be clearly understood that the embodiments mentioned in the description of this application are illustrative and not restrictive. Further, equivalent component changes within the scope of the present application without departing from the technical spirit or field of the invention as defined in the following claims are intended to be within the spirit and scope of this application.

The invention claimed is:

1. A method for preparing a self-assembled porous three-dimensional zinc oxide nanoparticle structure, comprising:
    generating a dispersion by mixing a zinc precursor and an amine compound;
    generating nanoparticles by applying heat of a first temperature while introducing the dispersion into a microfluidic channel in a microfluidic device;
    aggregating nanoparticles by reacting a solution discharged from the microfluidic channel at a second temperature that is higher than the first temperature; and
    after mixing the solution and a C1-C4 alcohol, drying the precipitate to obtain nanoparticles or aggregates thereof,
    wherein in the generating the dispersion, a content of the zinc precursor dispersed in the amine compound is 1.67% (w/v) or more and 3.57% (w/v) or less.

2. The method according to claim 1, further comprising the step of forming a three-dimensional nanostructure by reacting the nanoparticles or aggregates thereof in an organic solvent at 40° C. to 60° C.

3. The method according to claim 2, wherein the content of nanoparticles or aggregates thereof in the organic solvent is comprised in a weight-to-volume ratio of 2 w/v to 10 w/v.

4. The method according to claim 2, wherein the organic solvent is one or more selected from the group consisting of hexane, methylene chloride, chloroform, benzene, toluene, xylene, isopropyl ether, triethylamine, heptane, octane, nonane, decane, isobutyl isobutyrate, tributylamine, undecane, 2,2,4-trimethylpentylacetate, isobutyl heptyl ketone, diisobutyl ketone, cyclopentane, cyclohexane, isobutylbenzene and ethylbenzene.

5. The method according to claim 1, wherein the first temperature is 70° C. to 90° C., and the second temperature is 140° C. to 180° C.

6. The method according to claim 1, wherein in the step of generating the nanoparticles, the reaction time is 20 minutes to 40 minutes, and in the step of aggregating the nanoparticles, the reaction time is 50 minutes to 100 minutes.

7. The method according to claim 1, wherein the flow rate when introducing the dispersion is 0.05 mL/min to 0.2 mL/min.

8. The method according to claim 1, wherein the amine compound is one or more selected from the group consisting of an alkylamine having 6 to 20 carbon atoms, oleylamine, cocoamine, tallowamine, hydrogenated tallowamine, laurylamine, stearylamine, dihydrogenated tallowamine, distearylamine, dodecyldimethylamine, didodecylmonomethylamine, tetradecyldimethylamine, octadecyldimethylamine, cocodimethylamine, dodecyltetradecyldimethylamine, trioctylamine hexamethyleneamine, hexamethylenetetraamine, cyclohexylamine, monoethanolamine, diethanolamine, ethylenediamine, polyethyleneamine, naphthalenediamine, stearylpropylenediamine, octamethylenediamine, nonanediamine and triethanolamine.

9. The method according to claim 1, wherein the zinc precursor is one or more selected from the group consisting of zinc acetate, zinc chloride, zinc sulfate, zinc citrate, zinc nitrate, zinc nitrate hexahydrate, zinc acetate dihydrate, zinc phosphate, zinc formate, zinc fluoride, zinc bromide, zinc iodide, zinc acetylacetonate, zinc hydroxide, diethyl zinc, dimethyl zinc, zinc peroxide, and zinc perchlorate.

10. The method according to claim 1, wherein the alcohol is one or more selected from the group consisting of methanol, ethanol, butanol, isopropyl alcohol, propanol, ethylene glycol and propylene glycol.

* * * * *